US010726558B2

(12) United States Patent
Ruda et al.

(10) Patent No.: US 10,726,558 B2
(45) Date of Patent: Jul. 28, 2020

(54) MACHINE LEARNING-BASED IMAGE RECOGNITION OF WEATHER DAMAGE

(71) Applicant: Dolphin AI, Inc., Sayville, NY (US)

(72) Inventors: Harald Ruda, Walpole, MA (US); Nicholas Hughes, Los Angeles, CA (US); Alexander Hughes, New York, NY (US)

(73) Assignee: Dolphin AI, Inc., Sayville, NY (US)

( * ) Notice: Subject to any disclaimer, the term of this patent is extended or adjusted under 35 U.S.C. 154(b) by 64 days.

(21) Appl. No.: 15/902,408

(22) Filed: Feb. 22, 2018

(65) Prior Publication Data

US 2018/0247416 A1    Aug. 30, 2018

Related U.S. Application Data

(60) Provisional application No. 62/463,920, filed on Feb. 27, 2017.

(51) Int. Cl.
*G06K 9/00* (2006.01)
*G06T 7/13* (2017.01)
(Continued)

(52) U.S. Cl.
CPC .............. *G06T 7/13* (2017.01); *B64C 39/024* (2013.01); *G06K 9/00637* (2013.01); *G06K 9/4604* (2013.01); *G06K 9/6256* (2013.01); *G06Q 40/08* (2013.01); *G06T 7/001* (2013.01); *G06T 7/0004* (2013.01); *G06T 17/05* (2013.01); *B64C 2201/123* (2013.01); *B64C 2201/127* (2013.01); *B64C 2201/141* (2013.01); *G06T 2200/04* (2013.01); *G06T 2207/10032* (2013.01);
(Continued)

(58) Field of Classification Search
CPC ........... G06T 7/13; G06T 7/001; G06T 17/05; G06T 2200/04; G06T 2207/10032; G06T 2207/20021; G06T 2207/20061; G06T 2207/20081; G06T 2207/20084; G06T 7/0004; G06Q 40/08; B64C 39/024; B64C 2201/141; B64C 2201/127; B64C 2201/123; G06K 9/00637; G06K 9/4604; G06K 9/6256
USPC ....................................................... 382/199
See application file for complete search history.

(56) References Cited

U.S. PATENT DOCUMENTS 7,780,089 B2    8/2010    Wang
8,180,112 B2    5/2012    Kurtz et al.
(Continued)

OTHER PUBLICATIONS

Pan et al., "Automatic Generation of Seamline Network Using Area Voronoi Diagrams With Overlap", Jun. 2009, IEEE Transactions on Geoscience and Remote Sensing, vol. 47, No. 6, pp. 1737-1744. (Year: 2009).*

(Continued)

*Primary Examiner* — Van D Huynh
(74) *Attorney, Agent, or Firm* — Behmke Innovation Group LLC; Kenneth J. Heywood; James J. Wong

(57) ABSTRACT

Various image analysis techniques are disclosed herein that automatically assess the damage to a rooftop of a building or other object. In some aspects, the system may determine the extent of the damage, as well as the type of damage. Further aspects provide for the automatic detection of the roof type, roof geometry, shingle or tile count, or other features that can be extracted from images of the rooftop.

20 Claims, 29 Drawing Sheets

(51) Int. Cl.

| | | |
|---|---|---|
| *G06Q 40/08* | (2012.01) | |
| *B64C 39/02* | (2006.01) | |
| *G06T 7/00* | (2017.01) | |
| *G06K 9/46* | (2006.01) | |
| *G06K 9/62* | (2006.01) | |
| *G06T 17/05* | (2011.01) | |

(52) U.S. Cl.
CPC .............. *G06T 2207/20021* (2013.01); *G06T 2207/20061* (2013.01); *G06T 2207/20081* (2013.01); *G06T 2207/20084* (2013.01)

(56) References Cited

U.S. PATENT DOCUMENTS

| | | |
|---|---|---|
| 8,346,578 B1 | 1/2013 | Hopkins, III et al. |
| 9,505,494 B1 | 11/2016 | Marlow et al. |
| 9,805,261 B1* | 10/2017 | Loveland ........... G06K 9/00637 |
| 2004/0013292 A1 | 1/2004 | Raunig |
| 2009/0265193 A1 | 10/2009 | Collins et al. |
| 2012/0101783 A1 | 4/2012 | Stephens et al. |
| 2014/0270492 A1* | 9/2014 | Christopulos .......... G06K 9/627 382/159 |
| 2014/0324483 A1* | 10/2014 | Plummer ........... G06Q 30/0278 705/4 |
| 2015/0073864 A1* | 3/2015 | Labrie .................... G06Q 10/06 705/7.29 |
| 2015/0093047 A1* | 4/2015 | Battcher ............... G06F 16/532 382/305 |
| 2015/0302529 A1 | 10/2015 | Jagannathan |
| 2015/0347872 A1 | 12/2015 | Taylor et al. |
| 2016/0259994 A1* | 9/2016 | Ravindran ............... G06N 3/08 |
| 2016/0313736 A1 | 10/2016 | Schultz et al. |
| 2017/0076438 A1 | 3/2017 | Kottenstette et al. |
| 2017/0352100 A1* | 12/2017 | Shreve ............... G06K 9/00664 |

OTHER PUBLICATIONS

International Search Report and Written Opinion dated Apr. 26, 2018 in connection with PCT/US2018/019348.

Pan et al., "Automatic Generation of Seamline Network Using Area Voronoi Diagrams With Overlap," IEEE Transactions on Geoscience and Remote Sensing, vol. 47, No. 6, Jun. 2009, pp. 1737-1744.

\* cited by examiner

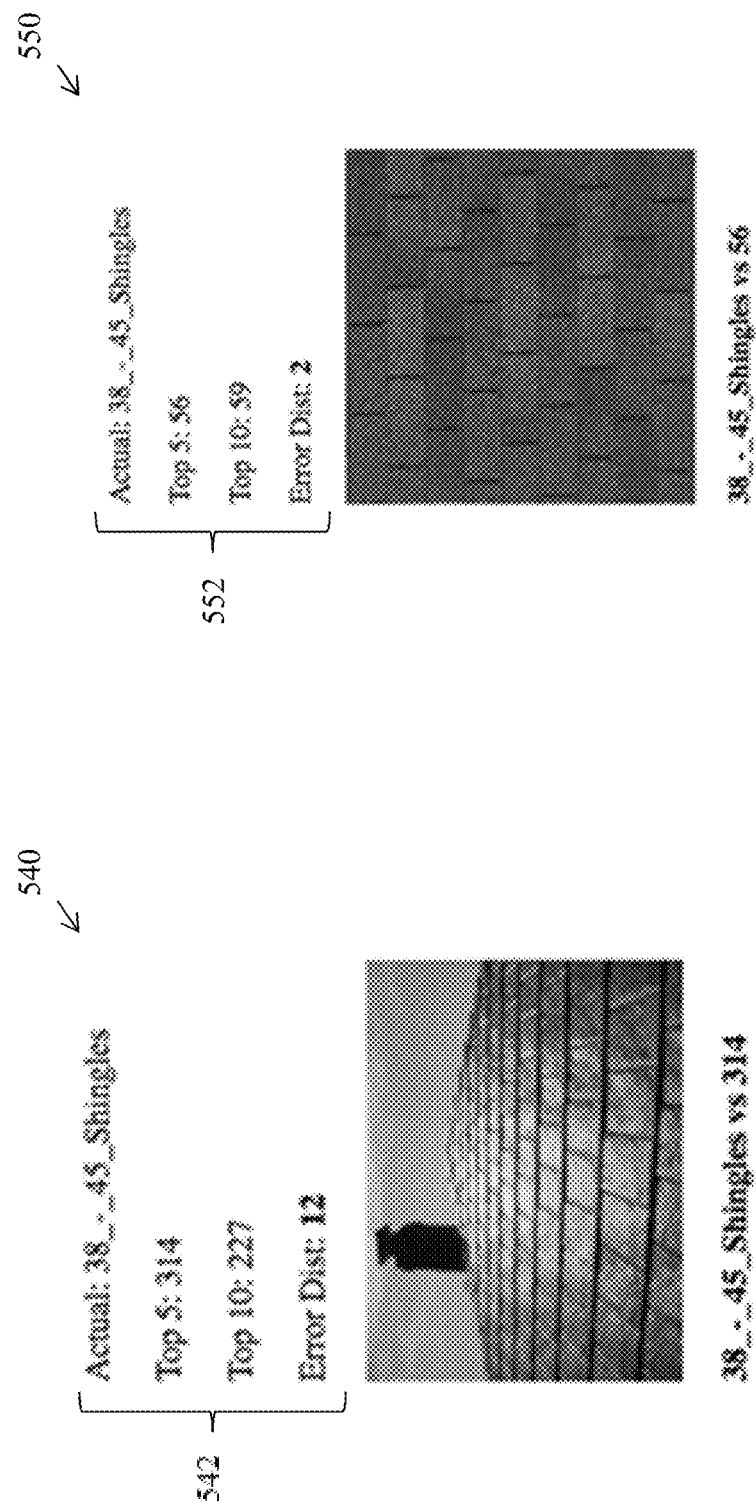

MACHINE LEARNING-BASED IMAGE RECOGNITION OF WEATHER DAMAGE

CROSS-REFERENCE TO RELATED APPLICATION

This application claims the benefit of U.S. Provisional Application No. 62/463,920, entitled "MACHINE LEARNING-BASED ASSESSMENT OF WEATHER DAMAGE," by Ruda et al, filed Feb. 27, 2017, the disclosure of which is incorporated herein by reference.

TECHNICAL FIELD

The present disclosure relates generally to computerized systems and, more particularly, to the assessment of damage found in images using machine learning.

BACKGROUND

In recent years, interest in image analysis has grown considerably across a number of industries. For example, in the medical field, image analysis has been used to detect tumors and other foreign bodies within an organism. In another example, security systems now use image analysis for facial recognition, the detection of suspicious packages, etc. In yet another example, tollbooths and parking garages are often equipped with license plate readers that are able to identify the license plate of a vehicle from an image of that vehicle.

Inclement weather can be highly damaging to property such as residential and commercial buildings, vehicles, and the like. For example, hail storms alone are the leading cause of property damage in the United States, with over 5,000 major hail storms typically occurring each year. Other examples of inclement weather that can result in property damage may also include wind, rain, snow, and ice, as well as severe storm conditions such as hurricanes and tornadoes.

After the occurrence of a storm, assessing weather-related damage to buildings, vehicles, etc., is a potentially dangerous and error-prone activity. In particular, assessing roof damage to a building may require an inspector to physically climb onto the roof and take pictures of the damage. In doing so, this exposes the inspector to potential injury, such as when proper safety procedures are not followed. Further, there is no guarantee that this process will correctly assess the extent of the damage and/or the type of the damage.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5F illustrate example classifications of rooftop images;

Figure 1A:
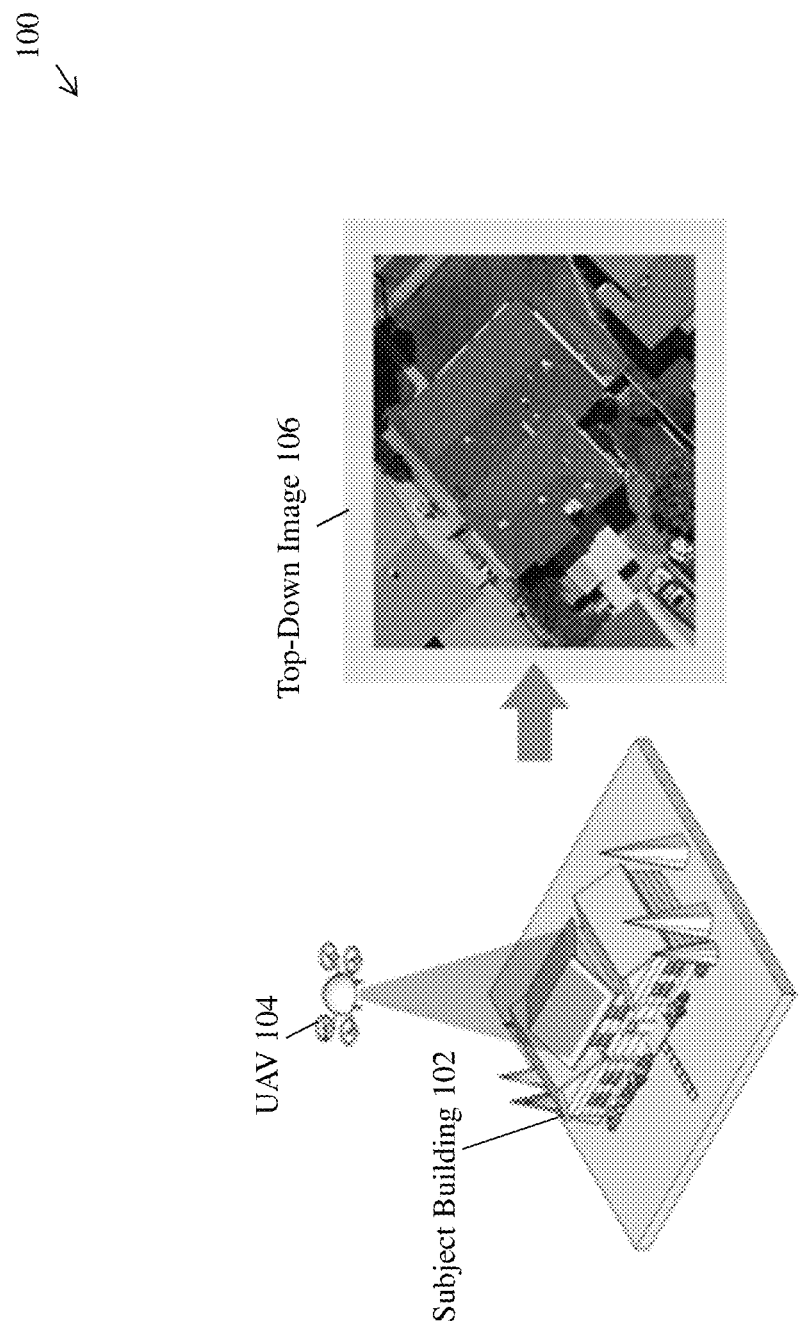
FIGS. 1A-1C illustrate examples of an image capture system.

In the figures, reference numbers refer to the same or equivalent parts of the present invention throughout the several figures of the drawing.

SUMMARY

According to the techniques described herein, systems and methods are disclosed in which machine learning is used to assess images of weather damage. In some aspects, the techniques herein may assess and identify the features of a roof or other structure (e.g., building façade, etc.), such as the type of roof, shingle type, and/or shingle count. In further aspects, the techniques herein may assess and identify the features of any damage to the structure, such as the type and extent of the damage.

In one embodiment, a method is disclosed that includes receiving, at a device, an image of a rooftop. The method also includes dividing, by the device, the image into a plurality of subdivision images, based on one or more characteristics of rooftop shingles or tiles depicted in the subdivision images. The method further includes applying, by the device, a machine learning-based classifier to one or more of the subdivision images. The classifier is configured to detect damage done to a particular one of the shingles or tiles depicted in a particular subdivision image under analysis and to assign a damage type to the detected damage. The method additionally includes sending, by the device, display data for display that is indicative of an extent of damage to the rooftop associated with the assigned damage type.

In another embodiment, an apparatus is disclosed. The apparatus includes one or more network interfaces to communicate with a network, a processor coupled to the network interfaces and configured to execute one or more processes, and a memory configured to store a process executable by the processor. When the process is executed, the apparatus is configured to receive an image of a rooftop and divide the image into a plurality of subdivision images, based on one or more characteristics of rooftop shingles or tiles depicted in the subdivision images. The apparatus is also configured to apply a machine learning-based classifier to one or more of the subdivision images, whereby the classifier is configured to detect damage done to a particular one of the shingles or tiles depicted in a particular subdivision image under analysis and to assign a damage type to the detected damage. When the process is executed, the apparatus is additionally configured to send display data for display that is indicative of an extent of damage to the rooftop associated with the assigned damage type.

In a further embodiment, a tangible, non-transitory, computer-readable medium is disclosed. The medium stores program instructions that cause a device to execute a process comprising receiving, at the device, an image of a rooftop. The process further includes dividing, by the device, the image into a plurality of subdivision images, based on one or more characteristics of rooftop shingles or tiles depicted in the subdivision images. The process additionally includes applying, by the device, a machine learning-based classifier to one or more of the subdivision images. The classifier is configured to detect damage done to a particular one of the shingles or tiles depicted in a particular subdivision image under analysis and to assign a damage type to the detected damage. The process also includes sending, by the device, display data for display that is indicative of an extent of damage to the rooftop associated with the assigned damage type.

DETAILED DESCRIPTION

FIG. 1 illustrates an example image capture system 100 that may be used with one or more of the embodiments described herein. As shown in FIG. 1A, system 100 may include a subject building 102 and unmanned aerial vehicle (UAV) 104. While the techniques herein are described primarily with respect to assessing the roof of a subject building, it is to be appreciated that the techniques can also be adapted for use by one skilled in the art for use to assess weather-related façade and siding damage to a building, damage to vehicles or other personal property, and the like.

In general, subject building 102 may be any form of residential or commercial building constructed using any variety of known construction materials. For example, the roof of subject building 102 may be covered with any number of different types of shingles such as, but not limited to, asphalt, fiberglass, wood, slate, or the like. In another example, the roof of subject building 102 may be covered with tiles, such as clay, etc. In a further example, the roof of subject building 102 may comprise one or more sheets of materials, such as metal sheets, or even one or more rubber membranes. As used herein, the term "shingle" may refer generally to any protrusion along the exterior of a structure that is configured to protect the structure from the effects of weather. For example, in the case of asphalt roofing shingles, a shingle may refer to individual tabs or to a collection of tabs that are formed together on a single sheet and connected by an adhesive backing.

Beyond the roof of subject building 102, the siding and other external components of subject building may be damaged by weather conditions. Such siding may also comprise any number of known materials. For example, the siding of subject building 102 may comprise wooden shingles or slats, brick, aluminum panels, composite shingles, or the like. Further external features of subject building 102 may include doors, windows, columns, and the like.

As noted above, various weather conditions can damage the exterior of subject building 102. For example, hail damage represents a large percentage of roof damage every year. Other types of weather-related damage may also include wind damage, water damage, and debris-related damage (e.g., from a flying branch, etc.). In addition, there may also be non-weather related causes of damage to the exterior of subject building 102. For example, some damage may be attributable to normal wear and tear (i.e., not due to a singular weather incident) and/or may be mechanical in nature, such as damage caused by a person or animal.

A first step in the process to assess the damage to the roof of subject building 102 consists in capturing images of subject building 102. In some embodiments, the captured images may be still images captured by one or more cameras. However, in further embodiments, the captured images may be extracted later on during processing from captured video, instead. Any number of known camera types may be used to capture images of subject building 102. For example, the camera may be a digital single-lens reflex camera, any form of charge coupled device (CCD)-based camera, infrared (IR) camera, etc.

In a preferred embodiment, the camera may be mounted onto UAV 104 and controlled remotely by a user to capture images of subject building 102. For example, UAV 104 may be a remote controlled airplane, helicopter, quadcopter, etc., equipped with a camera. In another embodiment, at least one image of subject building 102 may be captured via satellite. In further embodiments, however, a human operator may physically transport and actuate the camera, such as by physically climbing onto the roof of subject building 102. In yet another embodiment, the user may capture images of subject building 102 from a manned aircraft such as an ultralight, helicopter, airplane, or the like. In a further embodiment using autonomous operation, the UAV 104 is provided the GPS coordinates of the building and the UAV automatically captures the required images.

Figure 1B:
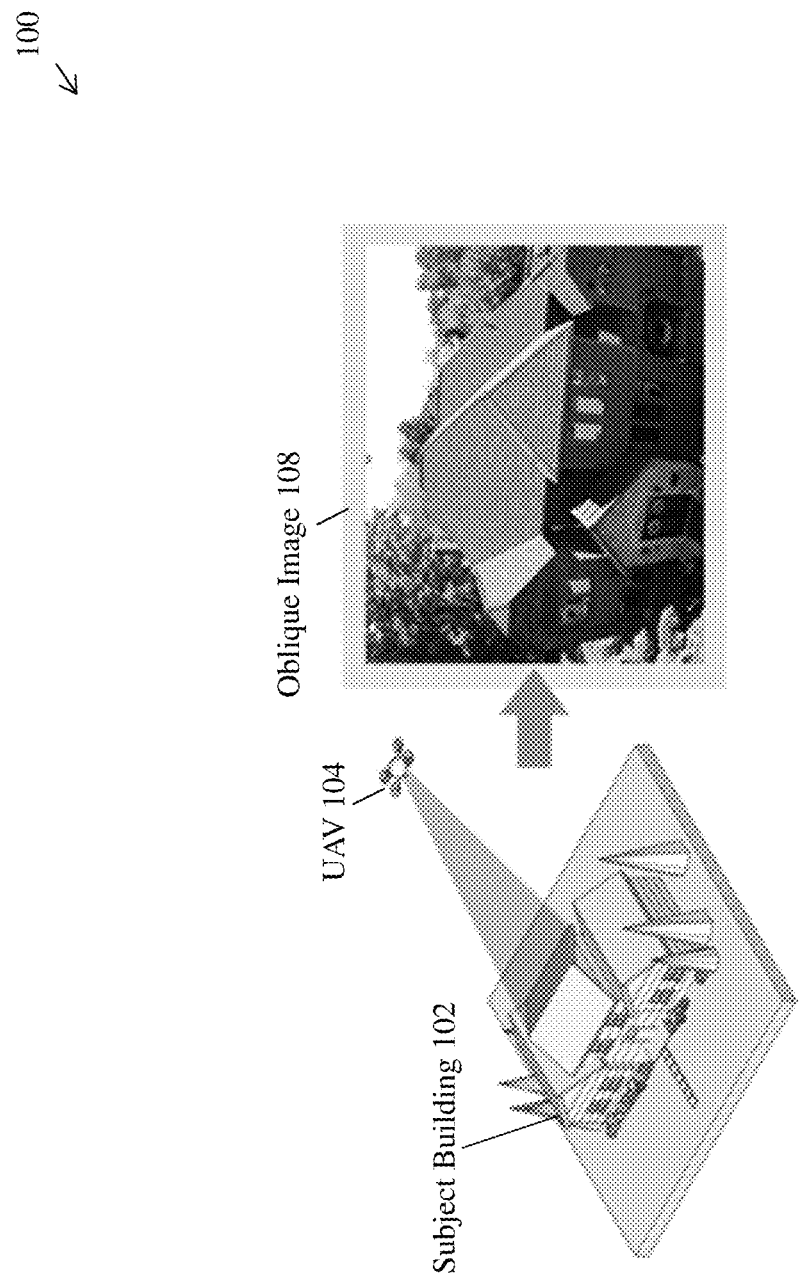
Figure 1C:
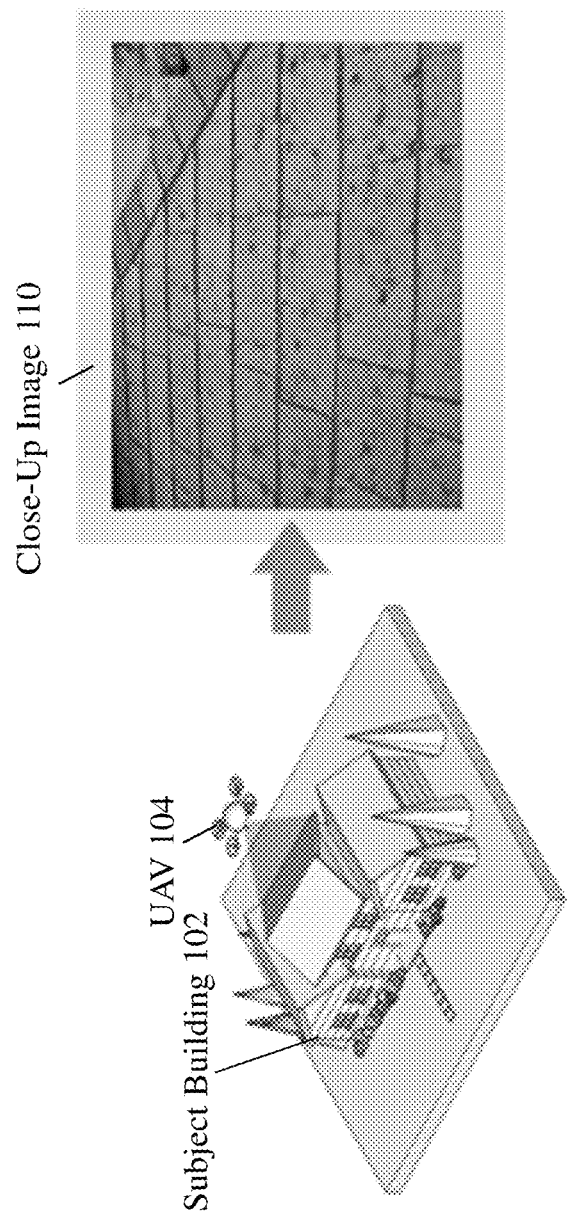

FIGS. 1A-1C illustrate three different types of images that can be captured of subject building 102. In some embodiments, the captured images should be of sufficient slope, visibility, and quality to identify damage on a per-shingle (or other unit of material) basis, automatically. For example, UAV 104 may capture any or all of the following:

At least one top-down image 106 of the entire roof of subject building 102 (e.g., from a location substantially perpendicular to the roof, as shown in FIG. 1A. In some cases, the techniques herein may use top-down image 106 to help the machine learning model verify the overall shape of the roof that it may construct using the other various captured images.

A plurality of oblique images of the roof of subject building 102, such as oblique image 108 shown in FIG. 1B. In some embodiments, the techniques herein may leverage the captured oblique images to help the machine learning model predict the area and pitch of the individual slopes of the roof of subject building 102. Further, the oblique images can be used to capture the boundaries between the slopes and edges of the roof of subject building 102. Note that oblique images have intrinsically less projection distortion, making the damage clearer from an image recognition standpoint.

Close-up images of any damage to the roof of subject building 102, such as close-up image 110 shown in FIG. 1C. Generally, the camera of UAV 104 or other camera need only be positioned at a distance from the roof of subject building 102 that would result in the damage being visible in the image. For example, wind damage is typically more visible than hail damage and images of wind damage can be captured from a greater distance to the roof than that of hail damage. These types of images may be captured by either relocating UAV 104 closer to building 102 or, alternatively, use a zoom lens to capture the close-up images.

Figure 2:
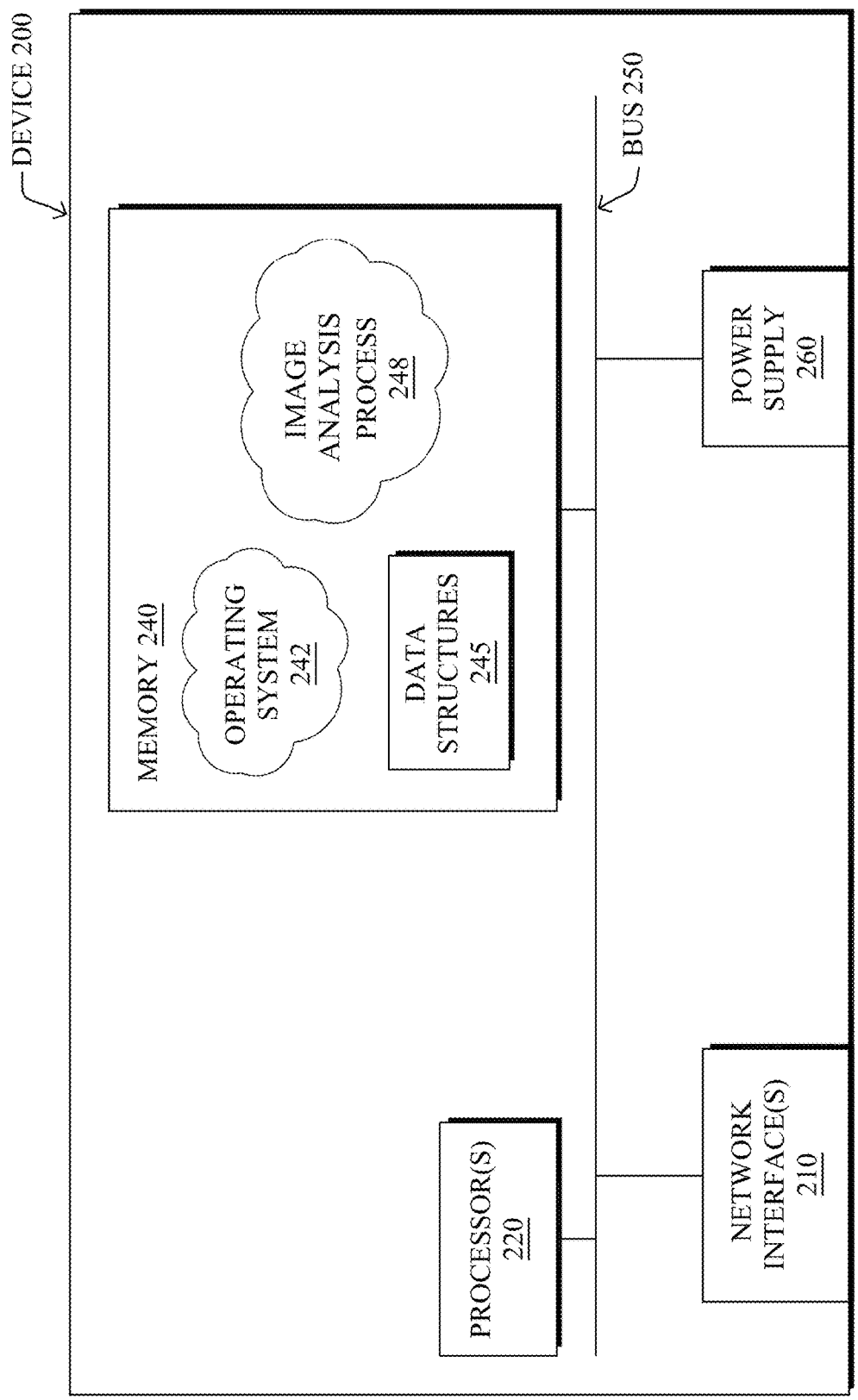
FIG. 2 illustrates an example computing device.

FIG. 2 is a schematic block diagram of an example device 200 that may be used with one or more embodiments described herein, e.g., as any of the devices or system shown in FIG. 1. Device 200 may comprise one or more network interfaces 210 (e.g., wired, wireless, etc.), at least one processor 220, and a memory 240 interconnected by a system bus 250, as well as a power supply 260 that provides electrical power to device 200.

The network interface(s) 210 contain the mechanical, electrical, and signaling circuitry for communicating data with other computing devices in system 100. The network interfaces may be configured to transmit and/or receive data using a variety of different communication protocols. Note, further, that device 200 may have two different types of network connections, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an image analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, where certain processes have been shown separately, those skilled in the art will appreciate that processes may be routines or modules within other processes.

Image analysis process 248 includes computer executable instructions that, when executed by processor 220, cause device 200 to perform the various image analysis functions described herein. More specifically, image analysis process 248 may be configured to assess the weather-related damage to a subject, such as a building (e.g., the roof, siding, etc.) or other object (e.g., a vehicle, etc.), that is present in captured images of the subject.

In various embodiments, image analysis process 248 may use machine learning to perform the analysis of the captured images. Generally, machine learning refers to any form of programmatic technique that can adapt to new forms of input data and produce a corresponding output. For example, in the context of analyzing images of weather-related damage to a roof, a machine learning-based process may be able to identify areas of damage in a given image, even though the process was not explicitly programmed to analyze that specific image.

A machine learning-based process may employ one or more supervised, unsupervised, or semi-supervised machine learning models to analyze the captured images of the subject. Generally, supervised learning entails the use of a training dataset, which is used to train the model to apply labels to the input data. For example, the training data may include sample images that have labeled image features, such as shingle or roof edges, examples of damaged areas vs. undamaged areas, etc. On the other end of the spectrum are unsupervised techniques that do not require a training set of labels. Semi-supervised learning approaches take a middle ground approach that uses a greatly reduced set of labeled training data.

Preferably, the machine learning model(s) of image analysis process 248 may include one or more deep-learning classifiers. Such a classifier may, for example, attempt to classify/label a given image or portion of an image based on a training set of labeled image data. Generally, deep-learning refers to a branch of machine learning that attempts to identify and leverage otherwise unseen patterns in the input data that may exist at one or more layers of abstraction from the input data.

In some embodiments, a given classifier of image analysis process 248 may comprise one or more trained artificial neural network (ANN), to classify the input image data. For example, a classifier of image analysis process 248 may be based on a convolution neural network (CNN) that uses a feed-forward approach. In another example, the classifier may use one or more multilayer perceptron (MLP) models. As would be appreciated, MLP models use a more general architecture than that of CNNs whereby CNNs utilize convolution elements, i.e., the same weights used repetitively at different locations in an image or current layer representation.

Further examples of machine learning techniques that image analysis process 248 may use may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), support vector machines (SVMs), logistic or other regression, Markov models or chains, principal component analysis (PCA) (e.g., for linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, in the case of damage identification, the false positives of the model may refer to the number of times the model incorrectly labeled a portion of an image as showing weather-related damage. Conversely, the false negatives of the model may refer to the number of times the model incorrectly labeled a portion of an image as not showing damage when, in fact, damage is present. True negatives and positives may refer to the number of times the model correctly labeled the image data. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives. A further performance measure for a machine learning-based classifier can also include the relative distribution of classes, such as log-loss (binary or multi-class).

Figure 3:
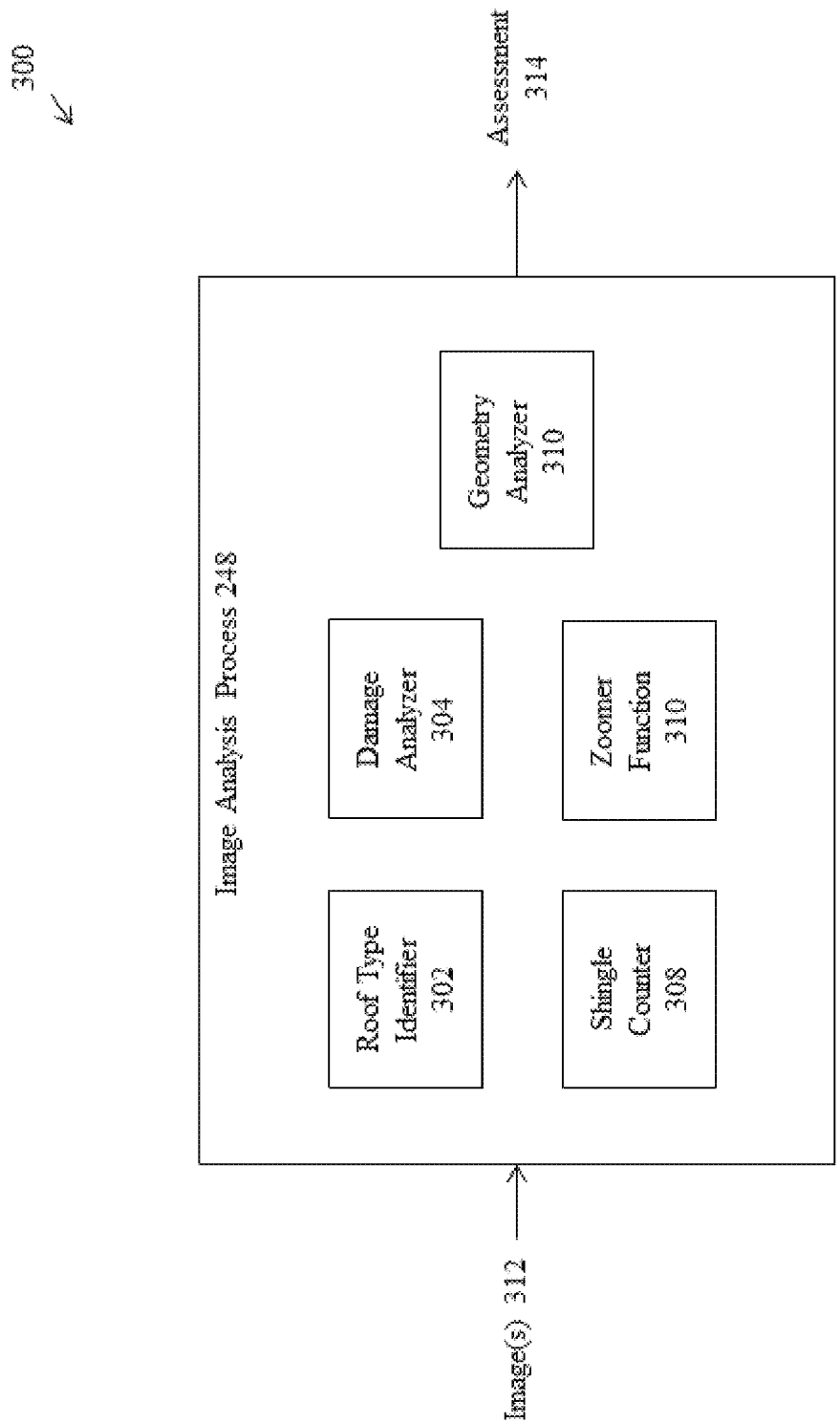
FIG. 3 illustrates an example architecture for analyzing images of weather-related damage.

FIG. 3 illustrates an example architecture 300 for analyzing images of weather-related damage, according to various embodiments. As shown, image analysis process 248 may include any number of sub-processes 302-310 and/or may access any number of memory locations. As would be appreciated, these sub-processes and/or memory locations may be located on the same device or implemented in a distributed manner across multiple devices, the combination of which may be viewed as a single system/device that executes image analysis process 248. Further, while certain functionalities are described with respect to the sub-processes and memory locations, these functions can be added, removed, or combined as desire, in further implementations.

Image analysis process 248 may receive any number of captured images 312 of the subject building or other object. In various implementations, images 312 may be captured using any of the approaches described above with respect to FIGS. 1A-1C and transferred to image analysis process 248 for analysis. For example, captured images 312 may be downloaded from UAV 104 and transferred via a network, portable drive, etc., to device 200 for analysis by image analysis process 248.

In some embodiments, image analysis process 248 may execute a roof type identifier 302. In general, roof type identifier 302 is configured to execute a machine learning-based model that has been trained to discern the roof type of the roof shown in captured images 312. Example roof types may include, but are not limited to, asphalt shingles, wood shingles, tiles, metal sheets, rubber membranes, and the like. A prototype of roof type identifier 302 has been constructed using a training dataset of approximately 100-200 hand labeled images of different roof types and has proven to be successful in identifying the roof type in a given image.

During testing, certain image guidelines were found to improve the operation of roof type identifier 302 as follows:

The majority of each image 310 (and the training dataset for roof type identifier 302) should depict roof material. Some of the images may be close-ups of just roofing material, other images may be taken from farther away, while further images may depict a mixture of both roofing material and other imagery.

The roof material depicted in any given image should still be clearly identifiable by a human user of the system.

The same variety of images 312 analyzed by roof type identifier 302 should be present in the training dataset for the machine learning model of roof type identifier 302.

The training dataset of roof type identifier 302 should also be balanced enough across all possible labels/categories, so that all labels/categories are decently represented. For example, one guideline may be to require that no label/category should have more than twice the number of images than that of any other category.

In various embodiments, image analysis process 248 may execute a damage analyzer 304 that is configured to detect damage present in images 312. Similar to roof type identifier 302, damage analyzer 304 may use a trained machine learning model, to identify different types of roof damage present in images 312. Example damage types may include, but are not limited to, weather-related damage such as damage attributable to hail, water, wind, lightning, etc. For example, different types of weather conditions may result in missing sections (e.g., tiles, shingles, etc.), flipped or bent sections, hail markings, or the like. Damage analyzer 304 may further be configured to discern certain roof feature such as skylights, vents, and the like.

In some cases, damage analyzer 304 may also determine a measure of consistency between any detected damage and a known weather event. Such a measure may indicate, e.g., whether any detected damage could be attributable to non-weather sources (e.g., damage by a human, etc.). For example, damage analyzer 304 may determine whether geolocation information associated with captured images 312 are consistent with the location of a known weather event, such as a hail storm. In some embodiments, damage analyzer 304 may also base the measure of consistency on a comparison between the detected extent and type of damage with the weather event. For example, damage analyzer 304 may further assess the distribution of damage on a given slope of the roof, the localization of the damage (e.g., middle vs. edge of shingles, etc.), the direction that the slope faces, the pitch of the slope, or any other damage features, in view of the specific details of the weather event (e.g., wind directions, wind strengths, etc.).

One key aspect of damage analyzer 304 may be its ability to detect damage to only a small portion of the roof, such as a three-by-three section of shingles, a two-by-two section of shingles, etc. Such a subdivision could be predefined or controlled using a user parameter (e.g., to adjust the size of the region being assessed for damage. To do so, any of images 312 that cover a larger area than this must first be split up into many smaller images that can each be processed by damage analyzer 304. To support the analysis of sub-portions of the roof in images 312 by damage analyzer 304, image analysis process 248 may include a shingle/tile counter 306 and/or a "zoomer" function 308, according to various embodiments.

In general, zoomer function 308 may determine whether a given image 312 should be divided into smaller, and potentially overlapping, images for processing by damage analyzer 304. To do this, zoomer function 308 may use yet another tuned deep learning classifier that outputs a sub-image that has approximately the desired number of shingles or tiles for analysis by damage analyzer 304. Notably, zoomer function 308 may be a combination computer vision/deep learning system whereby the deep learning classifier outputs an estimate of the number of shingles and the computer vision function cuts up the image appropriately, to get the right number of shingles in the output images. For example, the classifier of zoomer function 308 may be trained using a training dataset of images of shingles or tiles that were hand labeled to indicate the number of shingles or tiles in a given image area. In some embodiments, the smaller images from zoomer function 308 may have an overlap between one half and one whole shingle or tile, with the objective being to prevent any sub-image from depicting damage only at the edge of the image.

In order for zoomer function 308 to generate sub-images of images 312 that include a specified number of tiles or shingles, it may operate in conjunction with shingle/tile counter 306. Generally, shingle/tile counter 306 may be configured to discern and count the number of shingles or tiles present in a given image 312 or a portion thereof. In turn, zoomer function 308 may leverage this information to ensure that each sub-image analyzed by damage analyzer 304 has a set or threshold number of shingles or tiles. Notably, shingle/tile counter 306 may also execute a machine learning model that has been trained to identify each shingle or tile in each image 312. Preliminary testing has shown the shingle counting approach to provide better performance than that of the zoomer approach, but occasionally fails. Conversely, the zoomer approach is more general, but also tends to be less precise.

In some aspects, shingle/tile counter 306 may leverage image processing approaches such as filtering, edge detection, and thresholding, to find the boundaries of shingles or tiles in images 312. However, preliminary testing has revealed that these approaches work well on individual images, but are somewhat unable to work consistently well across all of the potential input images 312. When these approaches did work, it is possible to combine this with Hough transforms or another way of finding straight lines in images, to first find rows of shingles or tiles. The same method can again be used to break the rows into individual shingles or tiles.

In another embodiment, a more adaptable approach uses a trained CNN to indicate pixels that look like "edges" of shingles or tiles. In other words, shingle/tile counter 306 may use a deep learning network that takes as input small portions of images 312 and classifies them according to whether they are located on the boundaries of shingles or tiles.

To prototype a CNN for shingle/tile counter 306, a training dataset was created by hand labeling a set of images with both positive examples (e.g., a shingle or tile boundary) and negative examples (e.g., this portion is NOT a boundary of a shingle or tile). By choosing and carefully labeling a variety of images, a learning network can be created which works well under a number of different image conditions (e.g., lighting, roof color and conditions, etc.). In fact, because the Hough transform is used to find the straight lines from the boundary classifier output, this replacement for the segmentation does not have to be perfect, and it is better if it is strict in its interpretation and more conservative when assigning "boundary" labels. With the boundary classifier serving in place of the edge segmentation, this module is better able to identify individual shingles and generate sub-images for each shingle to be used for assessment or training.

In further embodiments, the boundary detector CNN may also be configured to identify a boundary orientation. In particular, for a known label line, the slope is also known (e.g., ranging from 0-180 degrees), allowing the CNN to learn this slope at the same time it learns the boundary type depicted in the image. When using this network to find boundaries in a new image, this results in identifying the boundary types at sparse locations, but with the addition of the orientation, it is simpler to connect these locations. In fact, it is a simple matter to rewrite/simplify the Hough transform to take advantage of this added information.

In additional embodiments, the boundary classifier may be used, not only to find the shingle boundaries, but also for determining the specific types roof boundaries. For example, the boundary classifier may be trained to distinguish any or all of the following classes/labels in a rooftop image: "ridge," "ridge-edge," "ridge-occluding," "hip," "hip-edge," "hip-occluding," "pitch-change," "valley," "inside-edge," "outside-edge," "occluding-edge," and/or "shingle-boundary."

In further embodiments, image analyzer 248 may also execute a geometry analyzer 310 that is configured to create a three dimensional (3D) model of a roof based on a set of input images 312 (e.g., approximately 10-20 aerial images of the roof). In some cases, geometry analyzer 310 may do so using stereophotogrammetry, which is a process that finds corresponding points in images, and inverting the transforms that take the 3D world into a set of two dimensional (2D) images. Usually, this approach iterates until the original 3D locations of key points or edges found in images are established (e.g., by correlating points or edges in the different images). This process can be aided if the locations of the cameras are known (e.g., by using the geolocation coordinates stored in the images). Once the transforms (e.g., locations and directions of cameras) have been established, it is possible to look for as many corresponding points as possible in any two images, and their 3D location can be established. From this, geometry analyzer 310 may generate a 3D point cloud and work surface descriptions can be obtained from this cloud.

Further approaches in accordance with the teachings herein leverage the observation that roofs almost exclusively comprise flat surfaces (e.g., slopes) and their corresponding intersections (e.g., roof edges, ridges, valleys, hip ridges, etc.). Thus, by finding corresponding slope boundaries in images 312, and because the boundaries are straight lines, it becomes much easier for geometry analyzer 310 to solve the 3D geometry problem. In other words, the techniques herein also introduce a mechanism to combine all of the images 312 into a smaller, more navigable collection of slopes/roof surfaces. This slope-based approach actually avoids the need to generate a point cloud that would need to be cleaned, interpolated, etc. Also, unlike the point cloud approach, the local integrity of the images is preserved and this again presents a clearer picture so that the damage is easier to detect. However, two challenges exist with respect to implementing a slope-based approach: 1.) how to find and properly classify the slope boundaries and 2.) how to know what is the appropriate geometry for the roof under consideration.

With respect to determining the slope boundaries, consider one side of a typical gable roof. When viewed from the side, the ridge at the top will be shorter than the edge at the bottom and the sides will be angled outwards. Since the shape of the slope is known to be a rectangle, it is easy to figure out the viewing angle and, given one single dimension (e.g., distance to slope, one of the dimensions of the roof, potentially the size of a shingle or tile, etc.), all the other dimensions can be determined. With more than one image 312, very high accuracy can be achieved. In turn, geometry analyzer 310 may use numerical optimization of roof parameters to fit data (slope boundaries) from all images 312. In addition, as GPS coordinates of the camera when the image was captured is usually stored with the image 312, geometry analyzer 310 may have access to all of the data necessary to estimate all dimensions.

A learning network similar to the one described above for shingle boundaries is used by geometry analyzer 310 to find and categorize slope boundaries (e.g., ridges, edges, valleys). Further, geometry analyzer 310 may be augmented with the output of shingle/tile counter 306. For example, geometry analyzer 310 sample from the outputs of the classifier of shingle/tile counter 306, pool them, and then use another layer of learning to determine the precise category of the slope edge, if it is even an edge at all.

To determine the right roof geometry, geometry analyzer 310 may employ an iterative approach that focuses on the slope boundaries. As would be appreciated, in order to properly fit the above mentioned slope boundaries, it is necessary to know the basic geometry or type of roof (e.g., gable, hip, gambrel etc.). Using an incrementally refined geometric model of the roof, it is possible to establish the slope boundaries and their locations as viewed from any particular camera location. This approach may start with one of the basic roof geometry types and attempt to fit the slope boundaries to the boundaries found in the images. Then, if there are slope boundaries in the images that are not accounted for a new roof element must be added, such as a gable or hip or just a single slope. The fitting procedure may then continue on with added geometry so that the dimensions of the added slope(s) can be determined.

The end result of the geometry analyzer 310 is a complete 3D geometry of the subject roof, such that the dimensions of each slope is known, and all the images 312 that contribute to each slope is also known. At this point, each slope can be examined in turn (e.g., by damage analyzer 304 and potentially leveraging zoomer process 308), and each shingle of the slope can be assessed for damage. By knowing the geometry and all the slopes of the roof, one can avoid duplicating damage that may appear in different images but actually be a specific location on a slope. The end result is a system that is highly accurate (finding all the damage) and also precise (not over-estimating) the damage.

As shown, image analysis process 248 may output assessment data 314 to a user interface, such as a local or remote display. At minimum, assessment data 314 may indicate the extent and/or type of any detected damage to the roof shown in images 312. Further information in assessment data 314 may also include any of the outputs or intermediate data from sub-processes 302-310. For example, assessment data 314 may indicate the number of shingles or tiles present in a particular one of images 312, a 3D representation of the roof from geometry analyzer 310, etc.

Figure 4A:
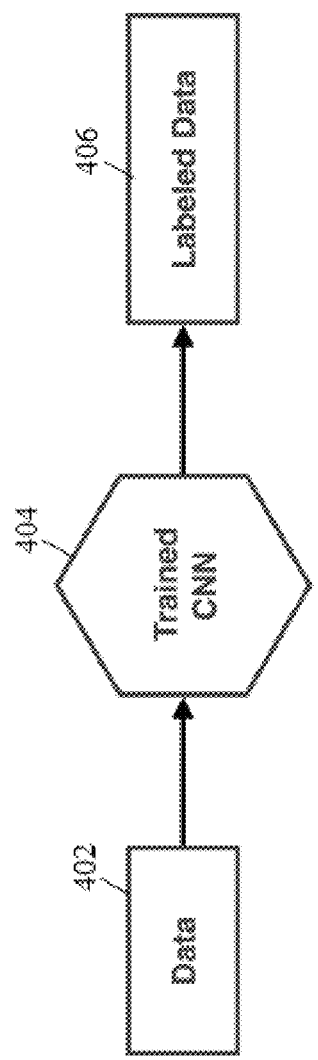
FIGS. 4A-4C illustrate examples of the use and training of a machine learning process.
Figure 4B:
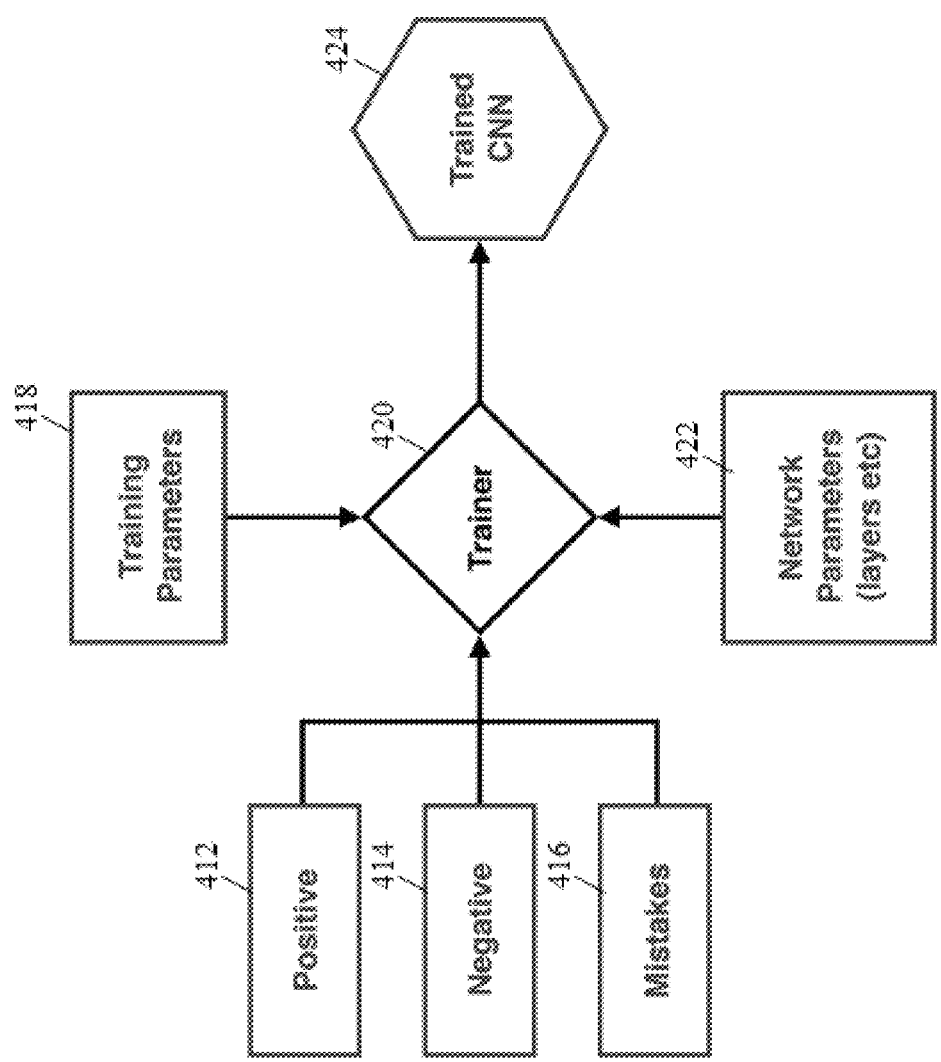
Figure 4C:
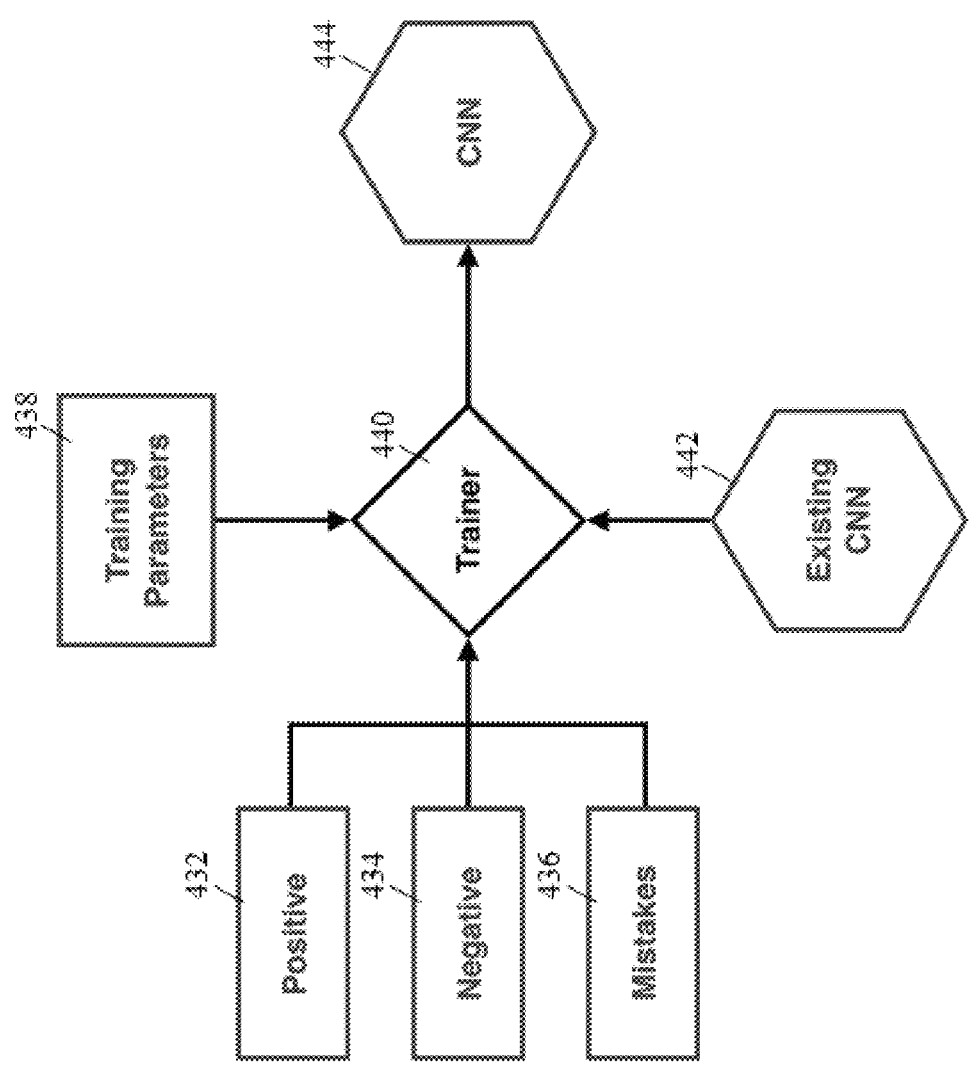

FIGS. 4A-4C illustrate examples of the use and training of a machine learning process, according to various embodiments. As noted previously, any or all of sub-processes 302-310 of image analysis process 248 may be configured to use machine learning models, such as a trained deep neural network (e.g., a CNN, etc.). As shown in the example 400 of FIG. 4A, the trained CNN may receive input data such as image data and, in turn, output one or more labels for the data. For example, in the case of shingle/tile counter 306, the CNN may label the edges of each shingle or tile, to obtain a total count of shingles or tiles present in the image.

In the example 410 of FIG. 4B, a training process may initially train the CNN using a set of labels (e.g., examples of positives, negatives, and/or mistakes), training parameters for the specific type of classifier, as well as network parameters for the neural network (e.g., the number of layers of the neural network, etc.). For example, the edges of shingles depicted in an image can be labeled as such by hand, to produce a set of training data for the CNN. Thus, the resulting CNN may look to for same or similar image characteristics as those associated with the edge labels, to identify shingle or tile edges in newly input images.

In the example 420 of FIG. 4C, an existing CNN can also be fine-tuned using feedback from an expert system or user. For example, such an expert may label images that are also analyzed by the existing CNN, to produce feedback regarding the performance of the existing CNN. For example, if the existing CNN failed to label a given shingle edge, the newly provided label from the expert can be used by the trainer to re-train the existing CNN accordingly, to prevent this mistake in the future.

A prototype system was developed to demonstrate the techniques disclosed herein. FIGS. 5A-5F illustrate examples of the classification of different rooftop images using the prototype system. As shown in FIG. 5A, rooftop image 500 primarily depicts a rooftop, but not completely, as the façade of the building is also show. From an initial classification standpoint, various prediction labels 502 were assigned to image 500 with their corresponding probabilities 504. Based on this classification, the system can then select the appropriate analysis steps and classification model to apply to image 500. For example, the most probable label is "200 shingles," which allows the system to then apply a model to image 500 that was specifically trained using images depicting between 200-249 shingles.

Figure 5B:
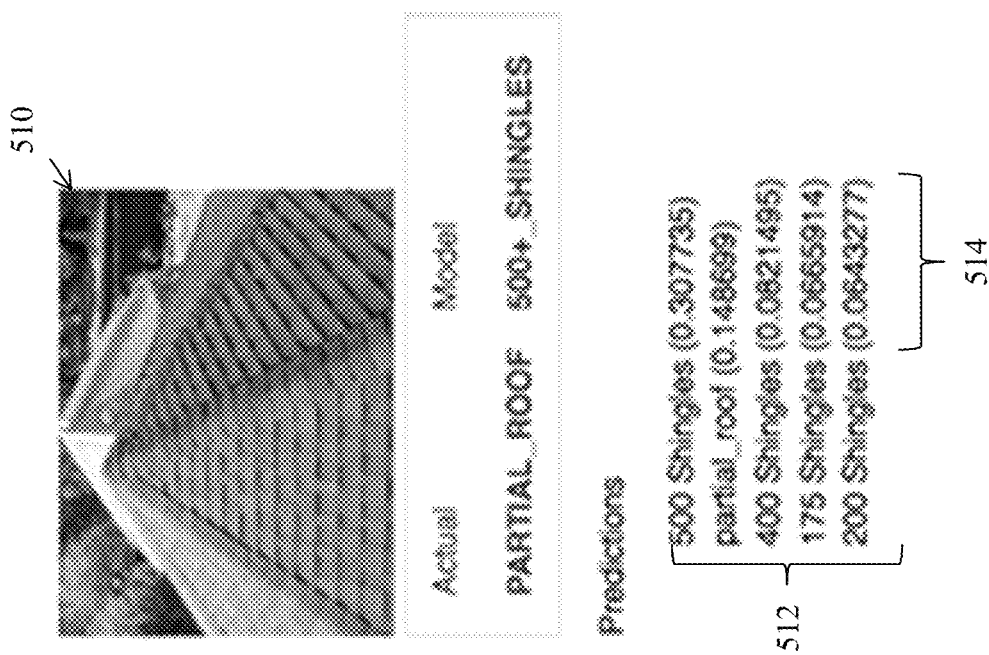
Figure 5A:
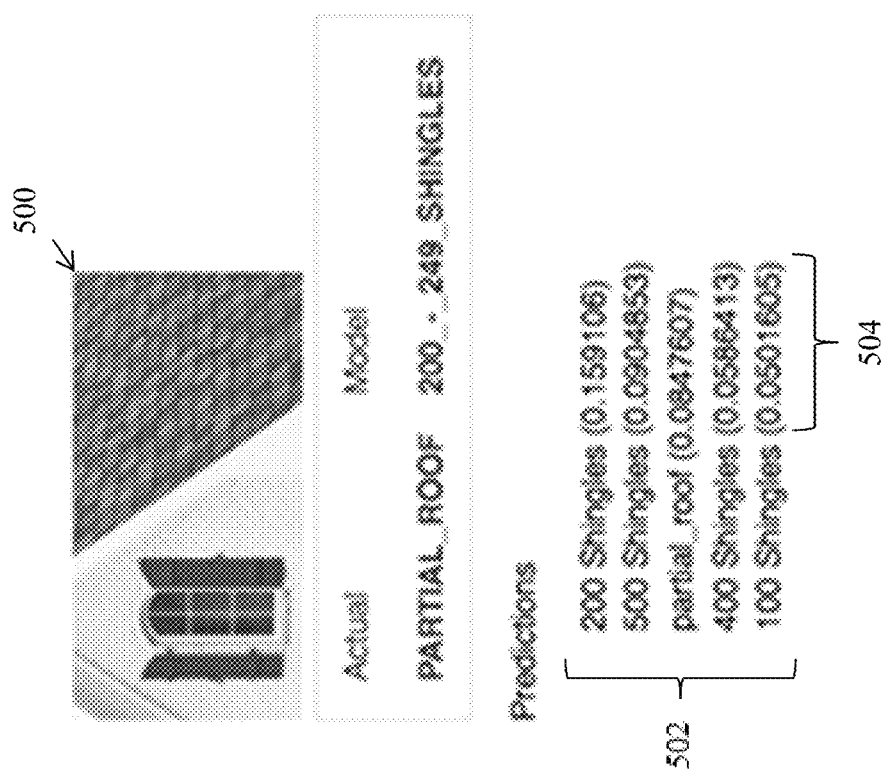

In FIG. 5B, another image 510 was classified, leading to a different set of labels 512 and their corresponding probabilities 514. As shown, image 510, in contrast to image 500, is classified as most likely depicting more than 500 shingles, thus allowing the system to select a different model for analysis of image 510 than that of image 500.

Figures 5C, 5D:
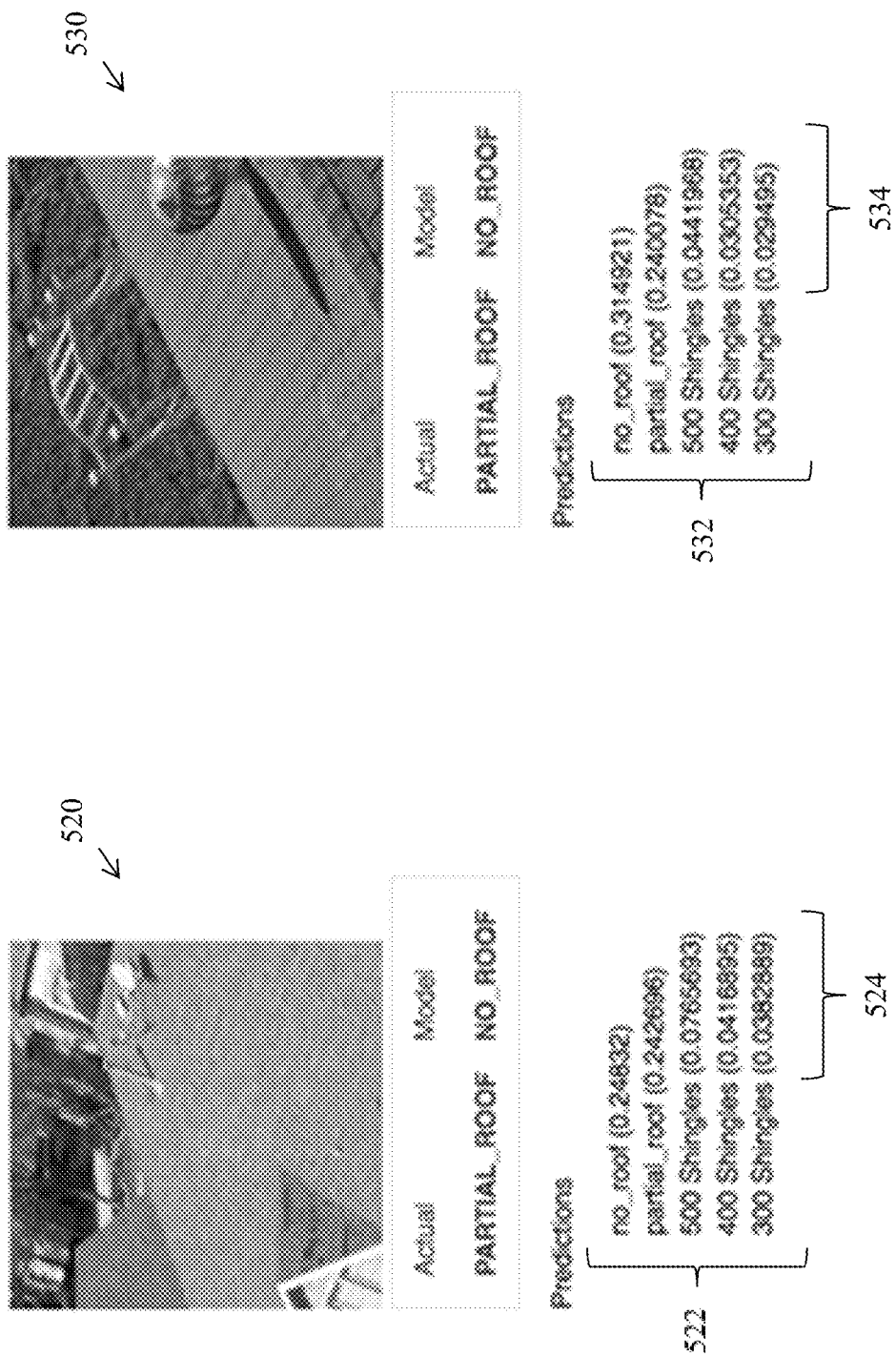
Figure 6A:
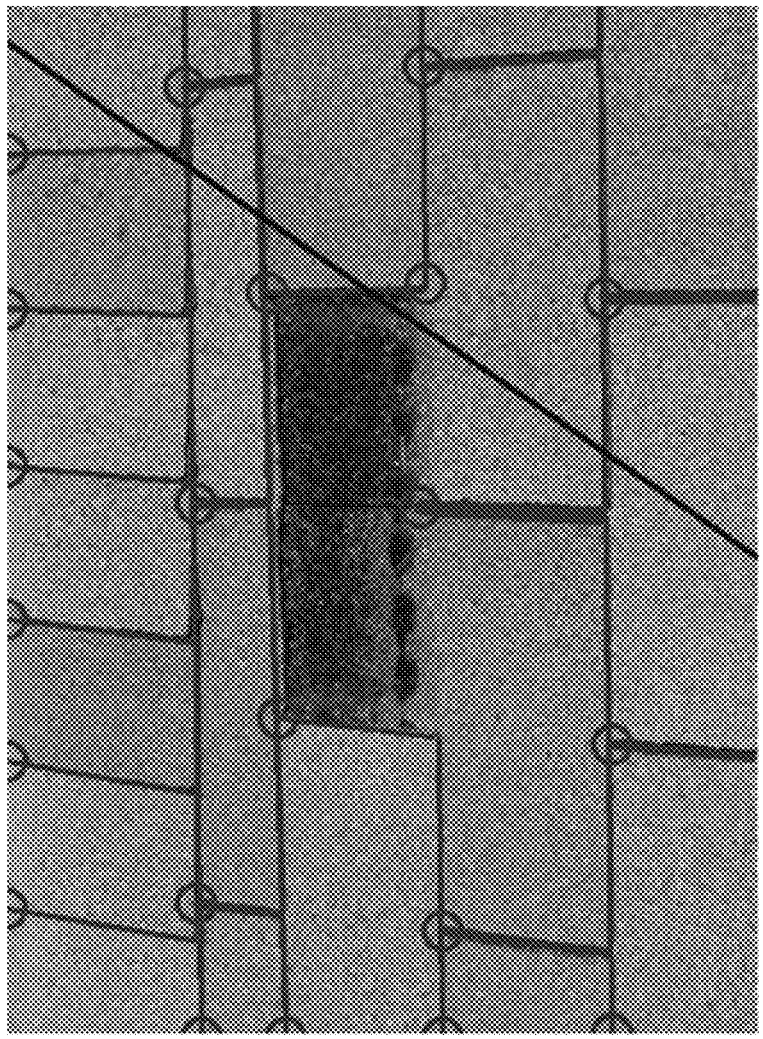
FIGS. 6A-6E illustrate examples of training data to discern shingles.
Figure 6B:
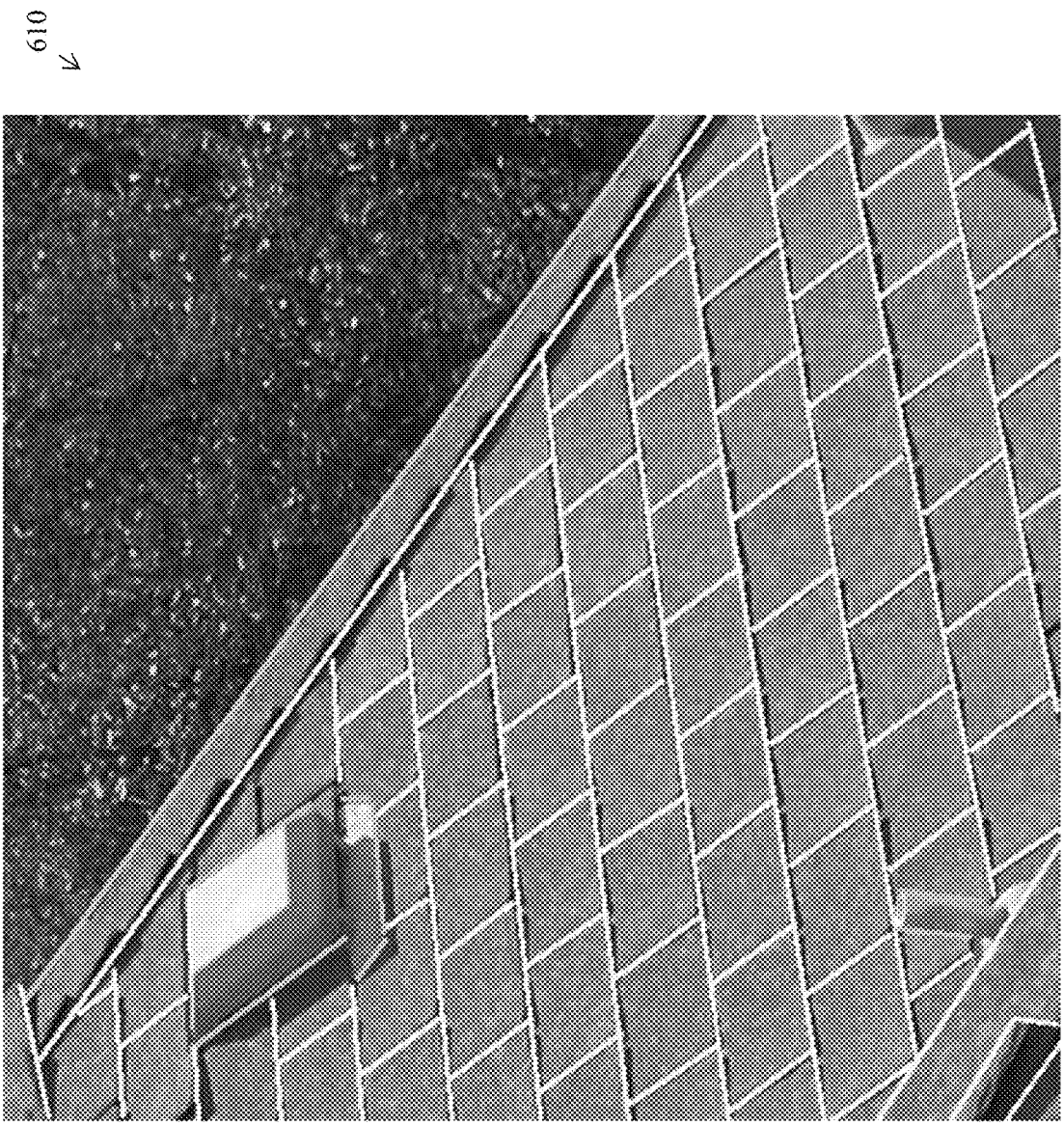
Figure 6C:
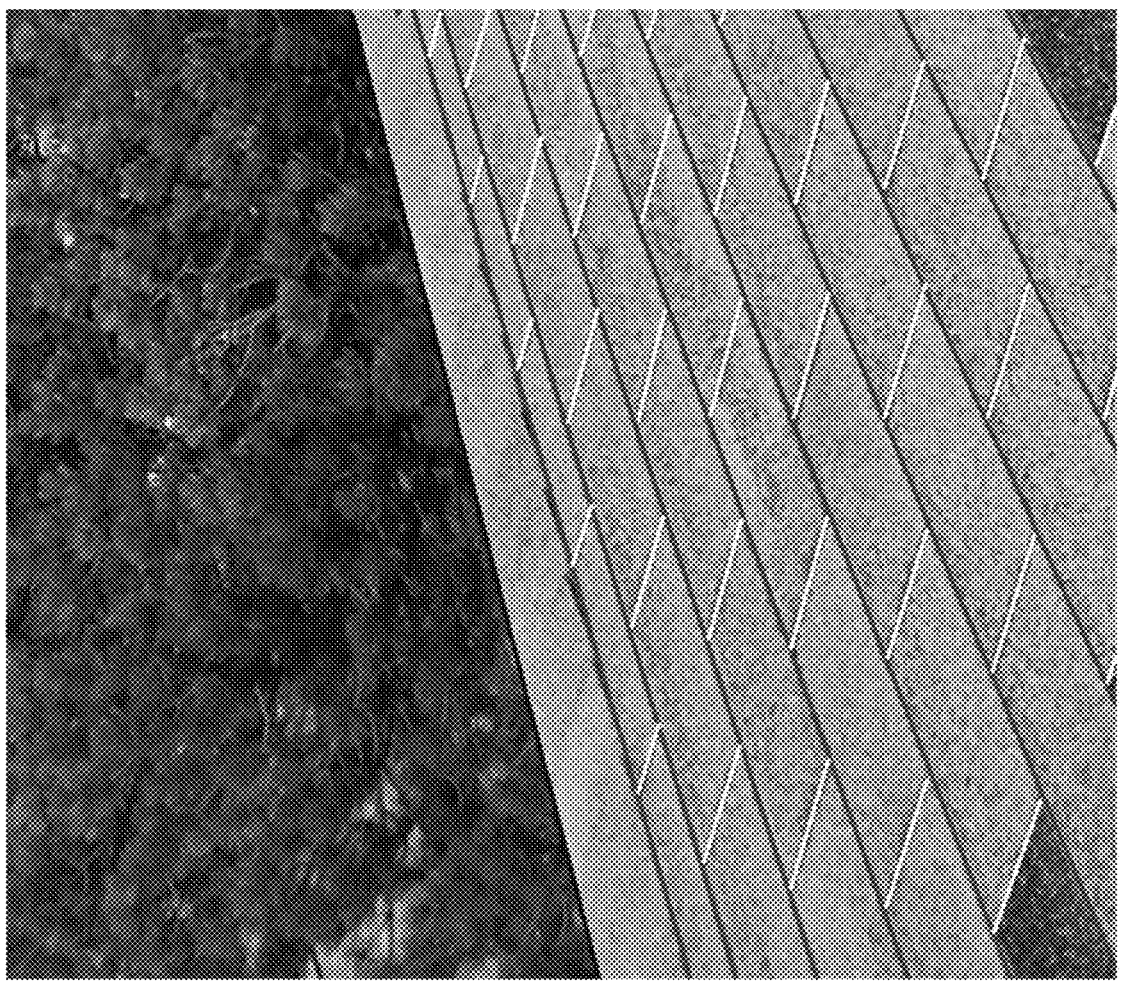
Figure 6D:
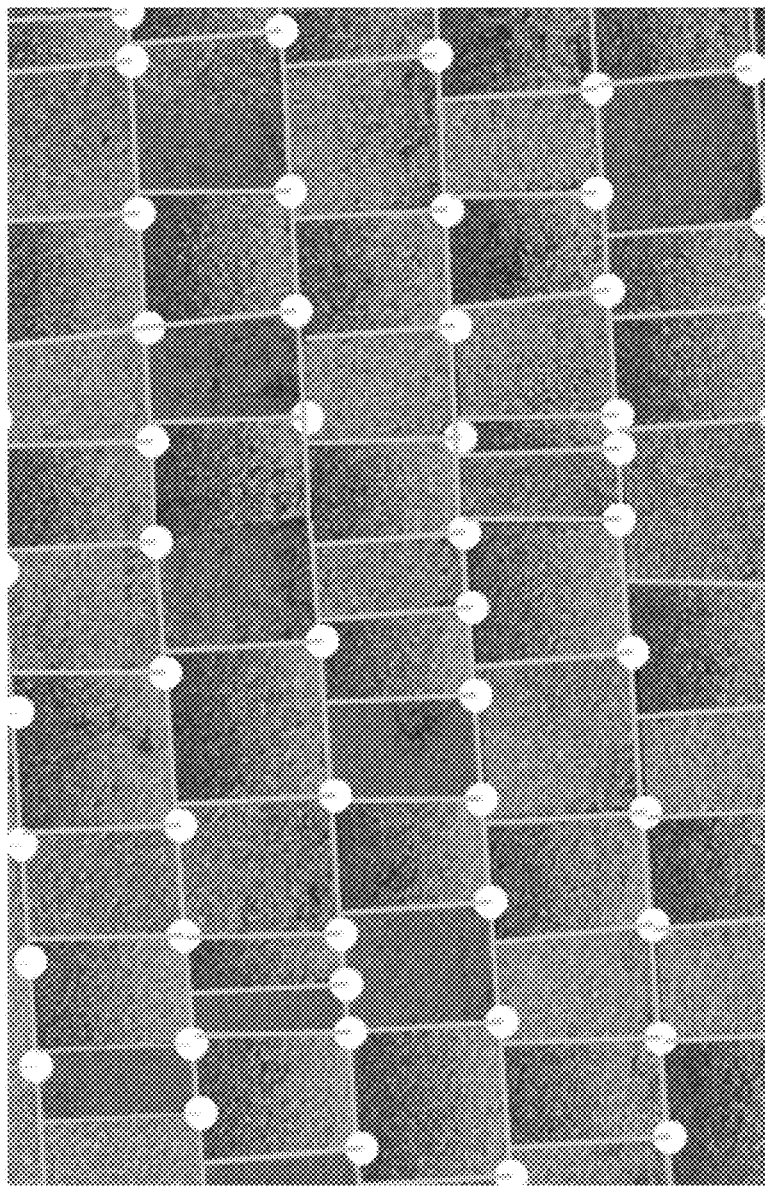
Figure 6E:
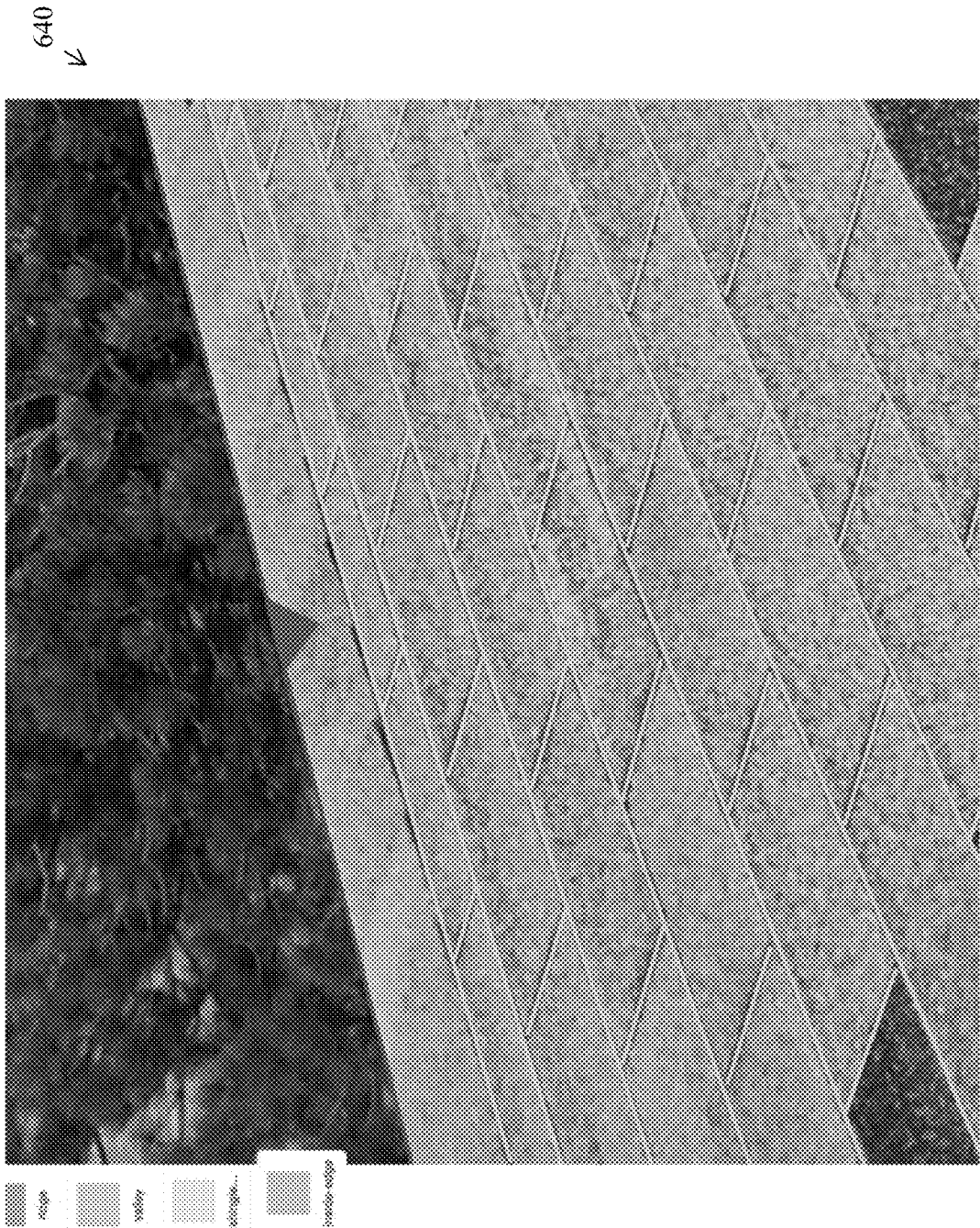

In FIG. 5C, the classifier outputted labels 522 for image 520, with their corresponding probabilities 524. From these, the most probable label was "no_roof," as the classifier was unable to properly distinguish between the portions of image 520 that depict a rooftop versus the portions of image 520 that do not. In some cases, this classification may be used to either disregard the image or to trigger subdivision of the image for further analysis. In FIG. 5D, image 530 was classified, resulting in labels 532 with probabilities 534. As in FIG. 5C, the most probable classification was "no_roof," due to image 530 depicting both the ground and a portion of the rooftop.

FIGS. 5E-5F illustrate application of a classifier specifically trained using images that depict between 38-45 shingles to images 540 and 550. As shown in FIG. 5E, image 540 actually depicts a total of 314 shingles leading to results 542, which includes an error distribution of 12. In contrast, image 550 in FIG. 5F shows 56 shingles, giving results 552 and an error distribution of only 2.

FIGS. 6A-6E illustrate examples of training data to discern shingles, according to various embodiments. As show in images 600-640, each image may be labeled by hand to distinguish the edges of each shingle (e.g., shingle tab) or tile. Further labels may distinguish other image features such as the edge of the roof itself, ridges or valleys, other roof characteristics such as vents or skylights, and the like. By providing these labels, the resulting CNN or other classifier can compare the image or pixel characteristics for a given label to that of a new image, to label the new image, accordingly. In a simple case, the labels may simple be "shingle-boundary" labels. However, more advanced model training is also possible by using other labels such as "ridge," "ridge-edge," "ridge-occluding," "hip," "pitch-change," "hip-edge," "hip-occluding," "valley," "inside-edge," "outside-edge," "occluding-edge," or the like.

Figure 7A:
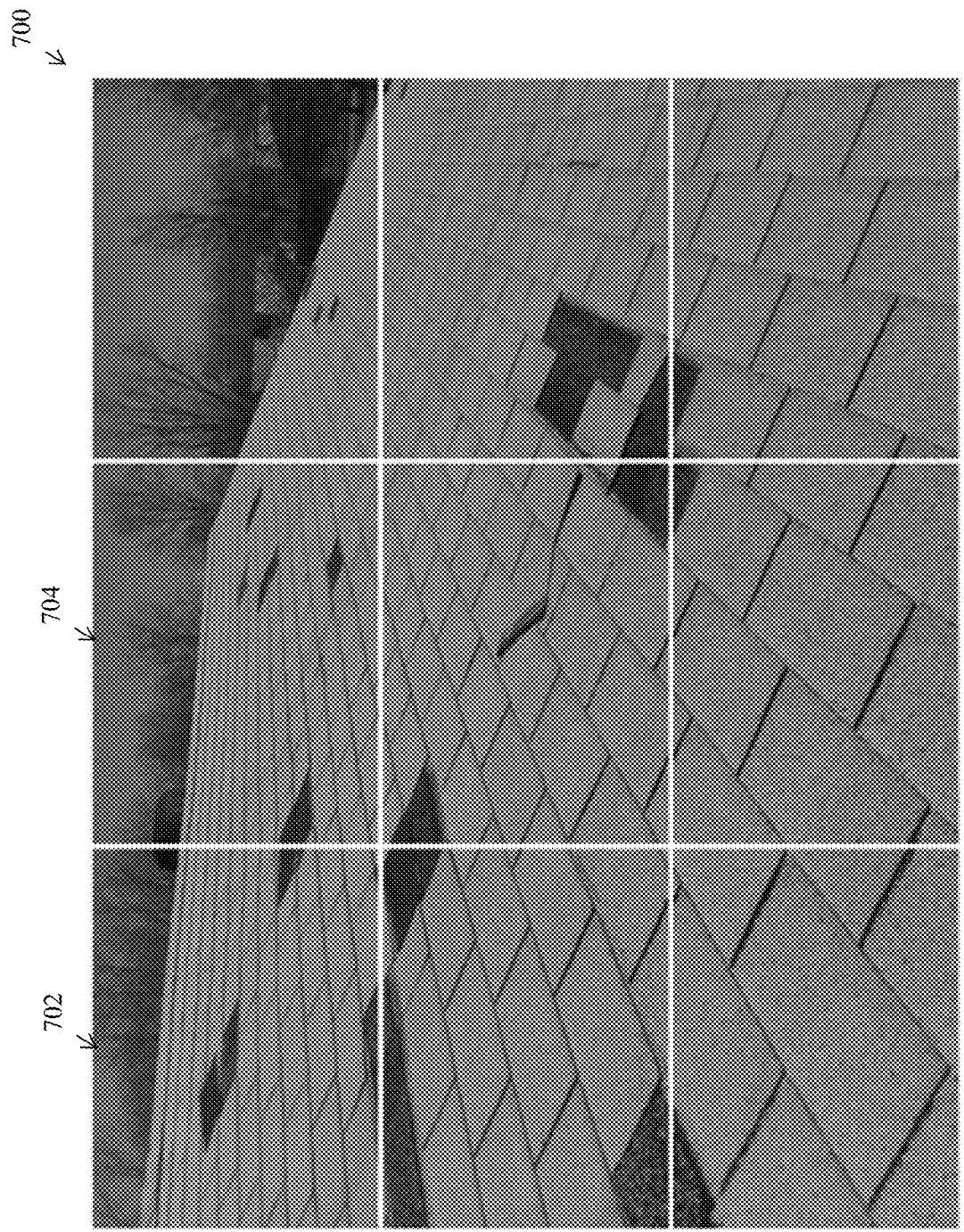
FIGS. 7A-7C illustrate examples of the subdivision of a rooftop image.
Figure 7B:
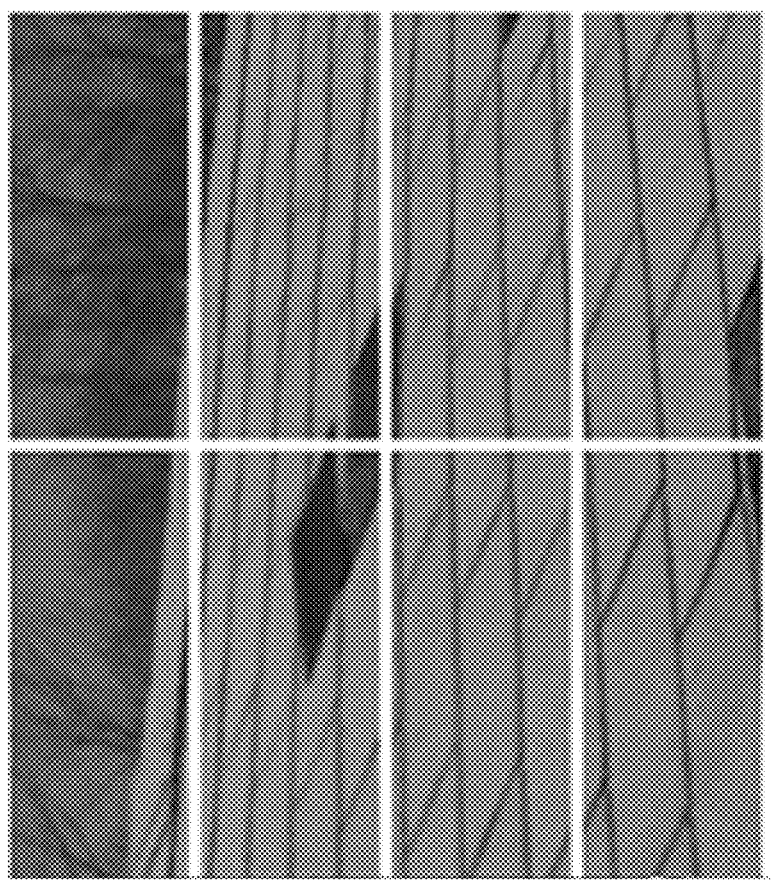
Figure 7C:
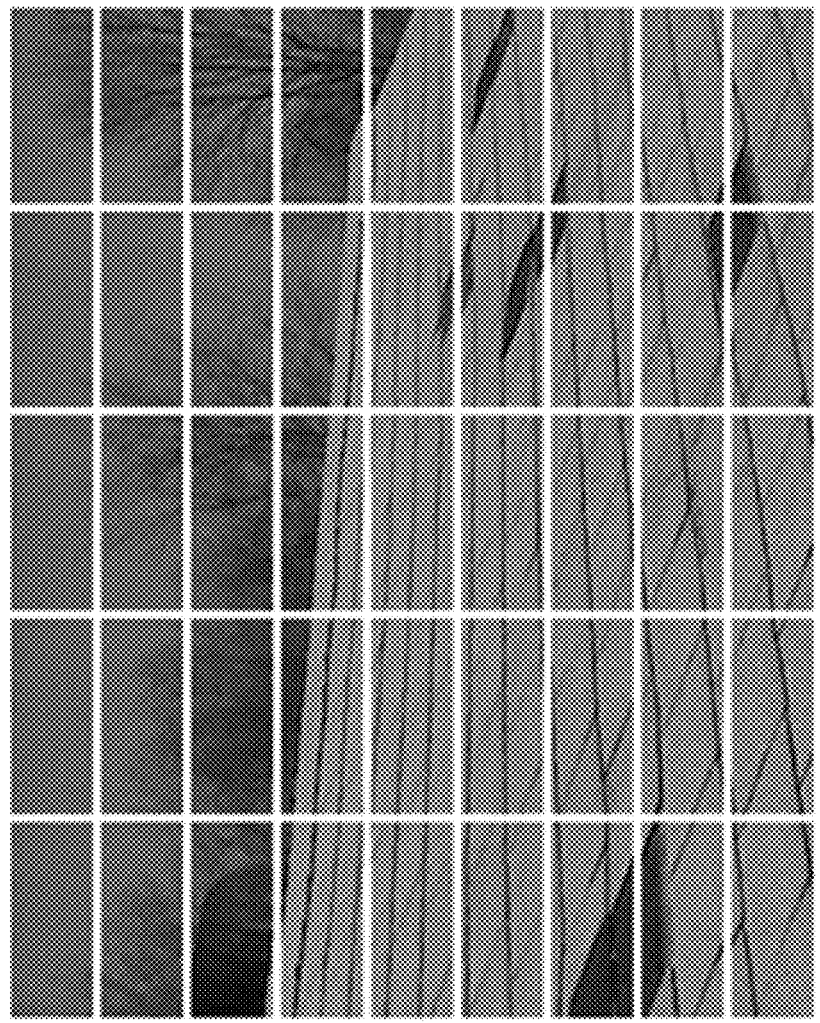

FIGS. 7A-7C illustrate examples of the subdivision of a rooftop image 700, according to various embodiments. As noted above, a given image of a rooftop, such as image 700 shown in FIG. 7A, may be subdivided based on one or more characteristics of the shingles or tiles depicted in the image. For example, as shown, the prototype system was trained to subdivide images such that each resulting subdivision image includes a number of shingles (tabs) or tiles within a predefined range. In another embodiment, each subdivision image may be formed such that any damage present is primarily centered in a given subdivision image, instead of at the edge of a sub-image. In further embodiments, such as when multiple slopes are depicted, the system may first subdivide the image into the individual slopes, before performing any further subdivisions.

By way of example, the subdivisions of rooftop image 700 may include subdivision images 702 and 704, shown in greater detail in FIGS. 7B and 7C, respectively. As would be appreciated, the subdivision process may entail multiple iterations and/or further refinements, such as due to the perspective of the camera. For example, as subdivision image 702 is closer to the camera than that of subdivision image 704, subdivision image 704 may depict a greater number of shingles/tabs. Accordingly, to ensure that each subdivision image used as input to the damage detection/classification process (e.g., damage analyzer 304) depicts a set number of shingles or within a given range, the system may further divide subdivision images 702-704. Notably, as shown in FIG. 7B, subdivision image 702 may be further subdivided into eight subdivisions, so that the resulting subdivisions depict a substantially equal number of shingles, if shingles are present. In contrast, as subdivision image 704 in FIG. 7C depicts more shingles than that of subdivision image 702, the system may subdivide image 704 into forty five subdivisions. As would be appreciated, both subdivisions of images 702-704 depict at most only a few shingles each.

FIGS. 8A-8E illustrate example training data for different damage types, according to various embodiments. As noted above, the machine learning process of damage analyzer 304 may be trained to classify whether a given image depicts damage and, if so, the extent and/or type of damage present in the input image. For example, a label may be applied to a given portion of the image (e.g., a colored box, etc.) that indicates whether damage is present and the type of damage. In turn, this labeled information can be used to train the classifier of damage analyzer 304 to identify areas of damage on a given roof, as well as the type/cause of the damage.

Figure 8A:
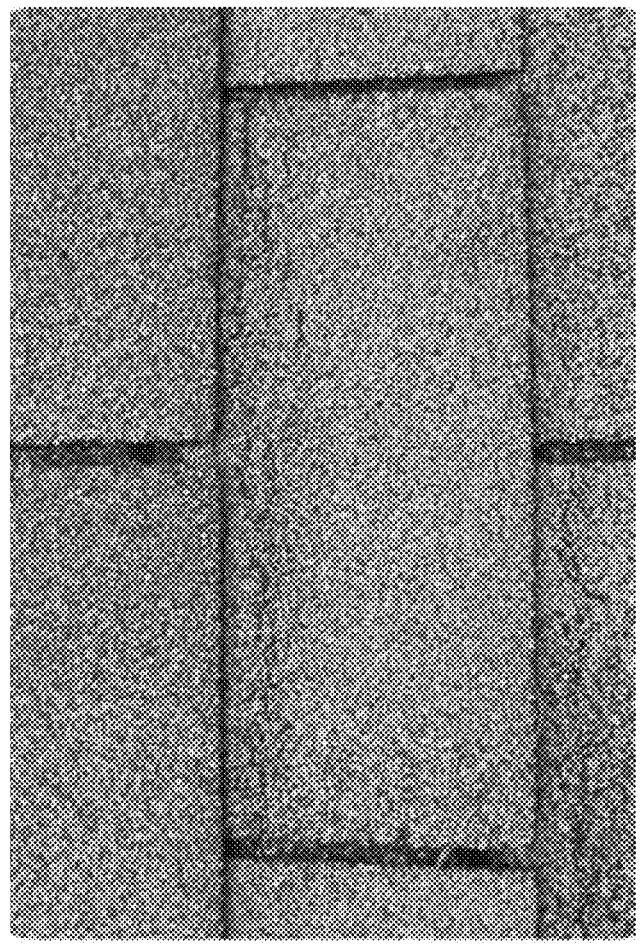
FIGS. 8A-8E illustrate example training data for different damage types.

FIG. 8A illustrates an image 800 depicting wind damage done to a rooftop. In particular, as shown, high winds can cause a shingle tab to fold backwards, thereby damaging the shingle by leaving a lasting crease in the tab. By labeling the portion of image 800 depicting this crease as "wind damage," image 800 can be used to train the damage classifier to detect similar creases in other images.

Figure 8B:
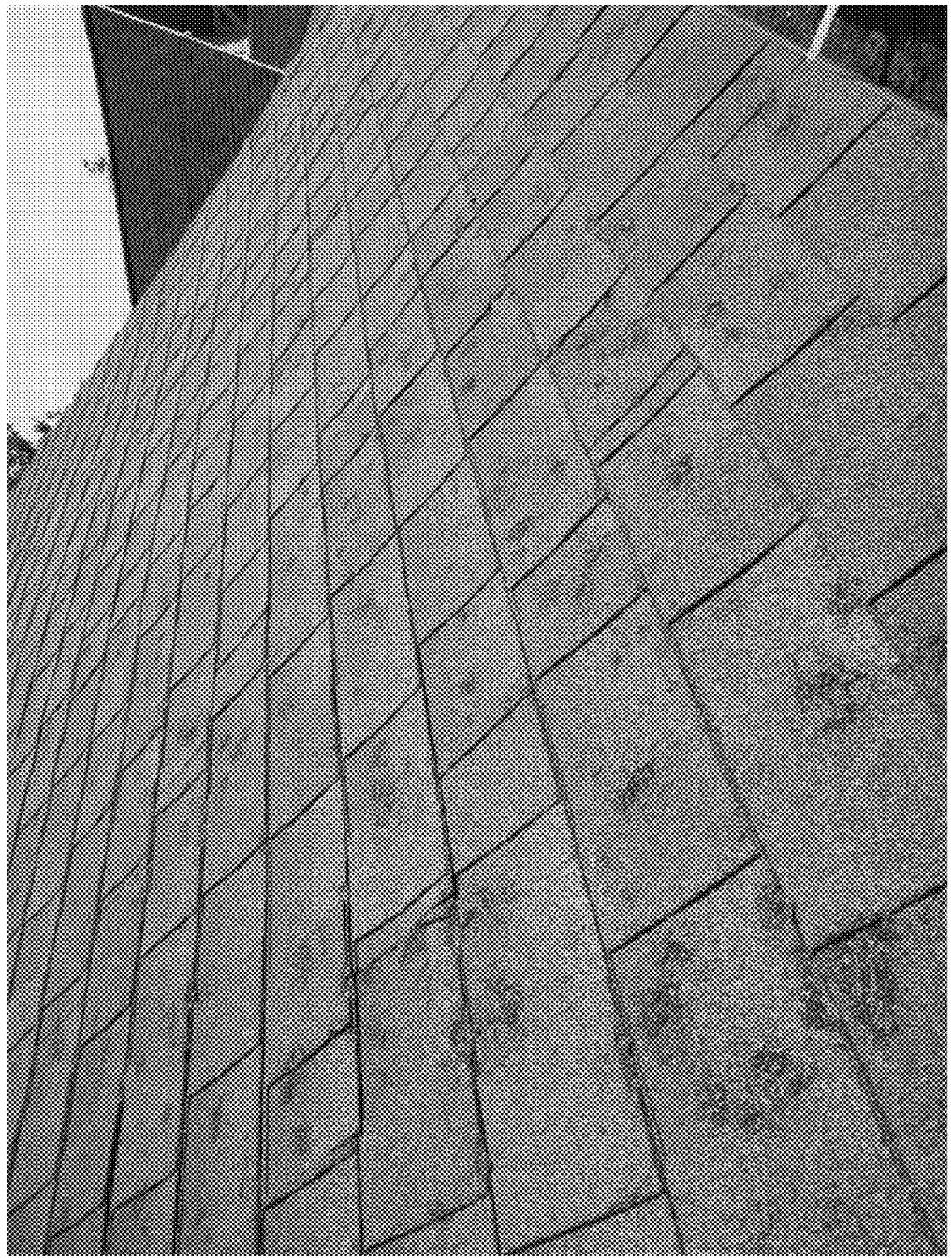

FIG. 8B illustrates an image 810 that depicts hail damage done to a rooftop. Hail damage is typified by abrasions made to the rooftop shingles or tiles by the impact of the hail. By labeling these abrasions in image 810 as "hail damage," image 810 can then be used to train the damage classifier to detect similar abrasions and, thus, hail damage, in other images.

Figure 8C:

FIG. 8C illustrates an image 820 that depicts ice damage to rooftop shingles. As shown, ice damage is typified by an uneven rooftop surface. For example, in the case of shingles, ice can accumulate underneath shingle tabs, thereby causing them to raise up and deform. By labeling these deformations as "ice damage," the damage classifier can also be trained to detect the presence of ice damage, such as due to ice dams, and the like.

Figure 8D:
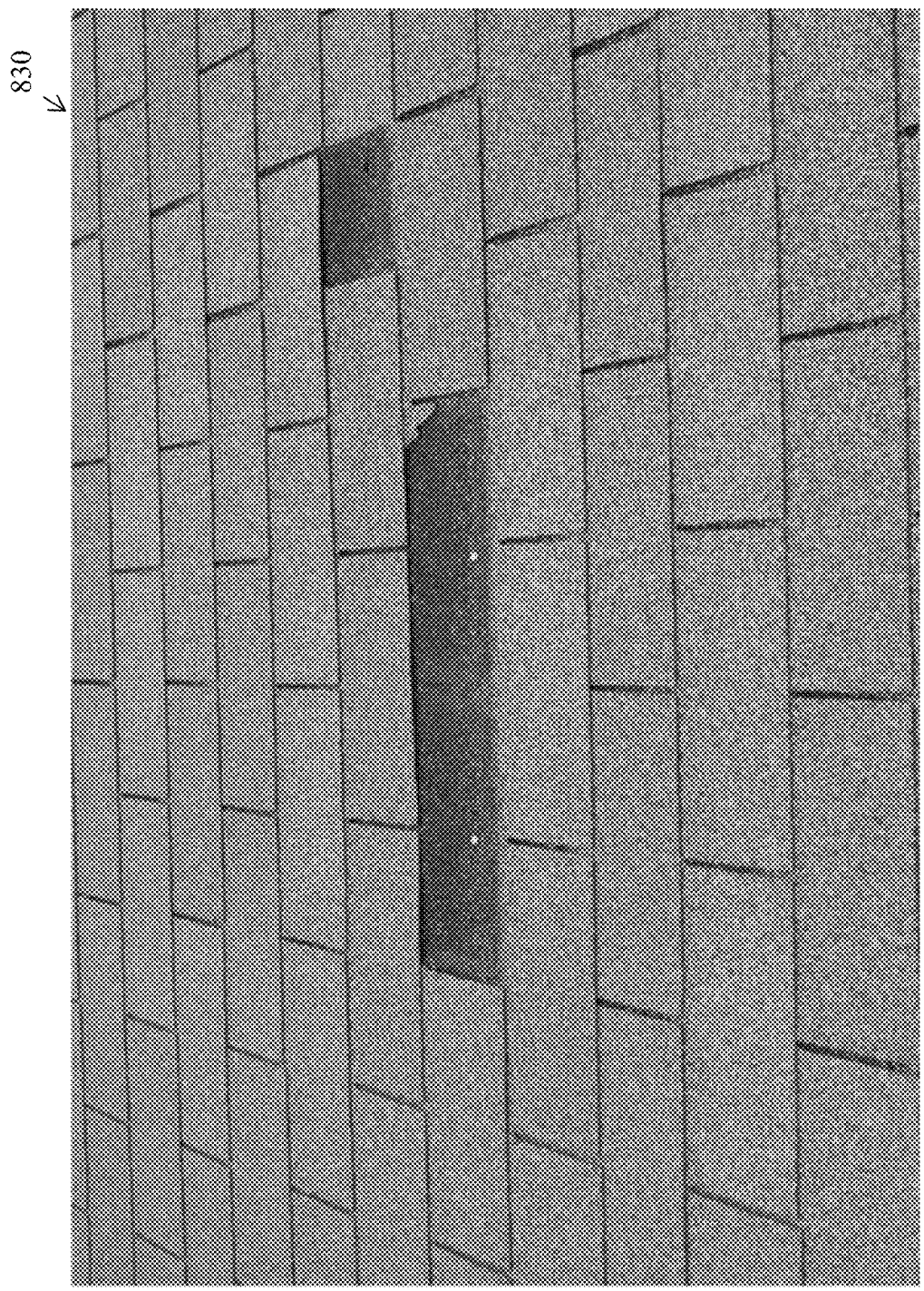

FIG. 8D illustrates another image 830 that depicts more serious wind damage, thus resulting in the actual loss of shingle tabs from the rooftop. By labeling these sections as such, the classifier can also be trained to detect more severe forms of wind damage, either using the same label as that for FIG. 8B or, alternatively, as a separate classification label. For example, by distinguishing between actual shingle loss and folding damage, the system can better quantify the extent of the damage to the rooftop.

Figure 8E:

FIG. 8E illustrates yet another image 840 that depicts rooftop damage due to normal wear and tear. As shown, wear and tear damage to a rooftop shingle may be distinguished by worn shingle edges and/or more uniform loss of asphalt from the surface of the shingle. By labeling this type of damage, the system is better able to distinguish between damage caused by weather and damage due to aging of the rooftop.

While not shown, another potential form of rooftop damage may be human-made. Although rare, rooftop damage can also occur for more fraudulent reasons. For example, an unscrupulous homeowner may intentionally damage his or her roof after a weather event, to submit a fraudulent claim. Preliminary analysis of images of human-made damage typically demonstrated the following characteristics: 1.) the damaged area tends to be much more concentric than that of typical hail damage, likely due to the use of a hammer to inflict the damage, and 2.) the distribution of the human-made damage also tended to be much more central to the exposed shingle tabs, whereas actual hail damage tends to be much more randomly dispersed across the rooftop. By labeling examples of human-made damage for classification and/or comparing a distribution of the damaged areas to known distributions of hail damage, the system can also distinguish the human-made damage.

Water damage is yet another type of damage that can be distinguished using the techniques herein. Particularly in the case of membrane roofs, but may be applicable to other roofing types, IR images will show different colorations from wet areas versus dry areas. By labeling these different image portions, the damage classifier can also be trained to identify water damage from an input image.

Figure 9:
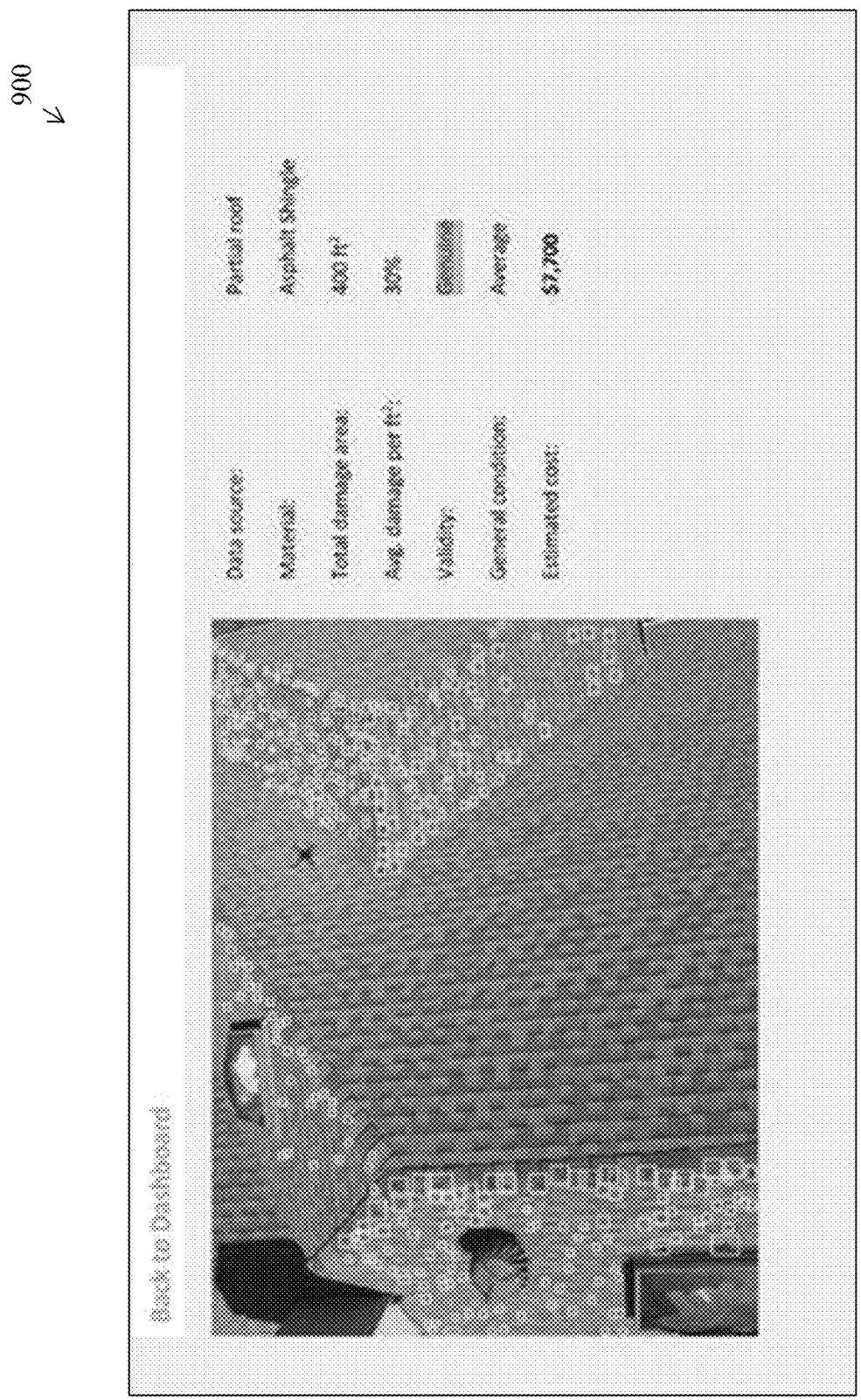
FIG. 9 illustrates an example user interface displaying data from the image recognition system.

FIG. 9 illustrates an example user interface 900 for the system described herein, according to various embodiments. As shown, user interface 900 may display assessment data 314 for review by a human user. For example and with respect to a given roof image, user interface 900 may display the estimated type of roofing material, total roof area (e.g., based on the geometry of the roof), total area of damage, cause of damage, estimate cost of the damage, or the like. In other words, in a typical implementation, the system may output data indicative of both the extent of damage (e.g., in terms of damage surface area, in terms of number of damaged shingles or tiles, etc.), as well as the damage type (e.g., hail, wind, etc.).

Figure 10A:
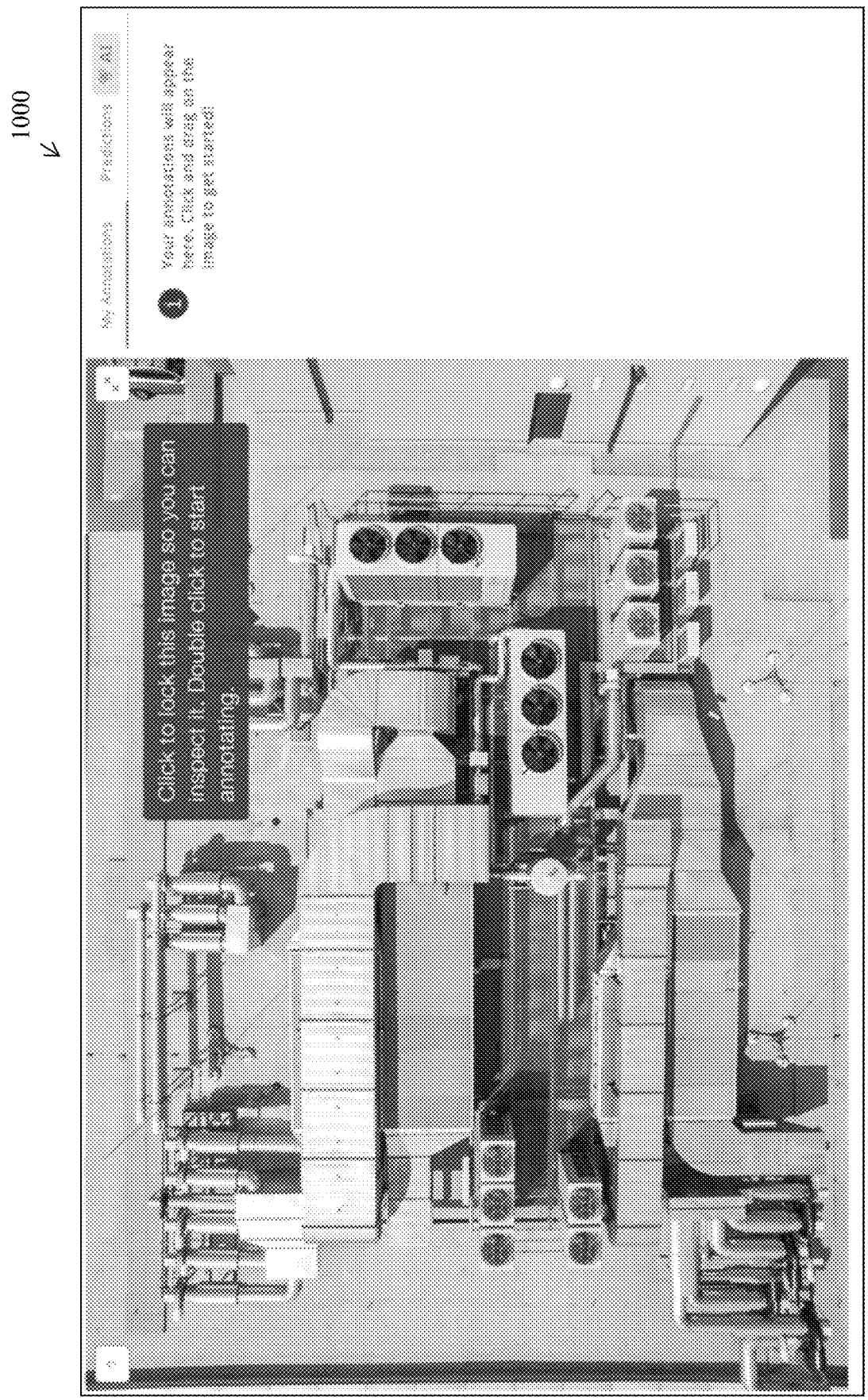
FIGS. 10A-10C illustrate examples of orthomosaic processing by the system.
Figure 10B:
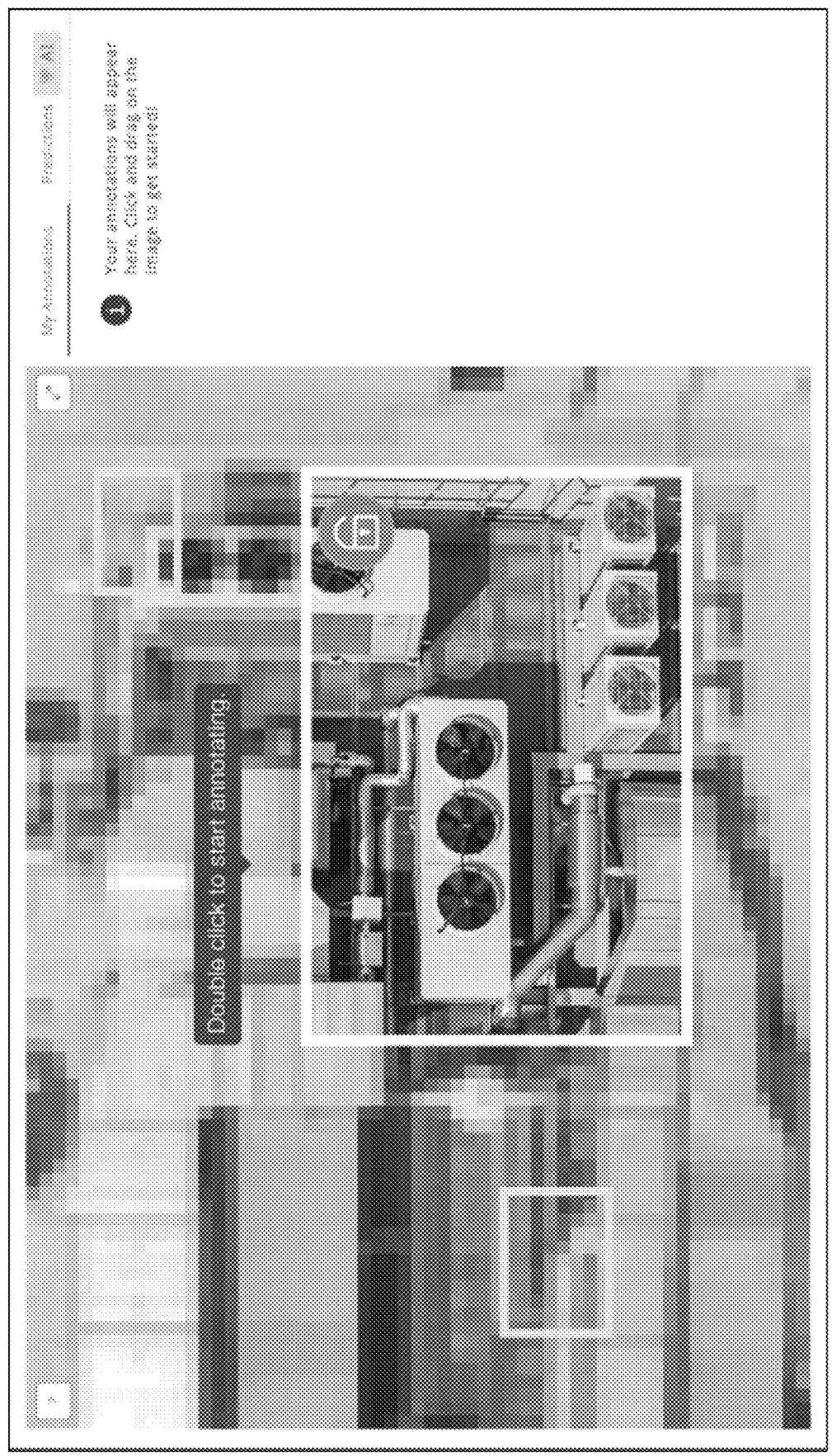
Figure 10C:
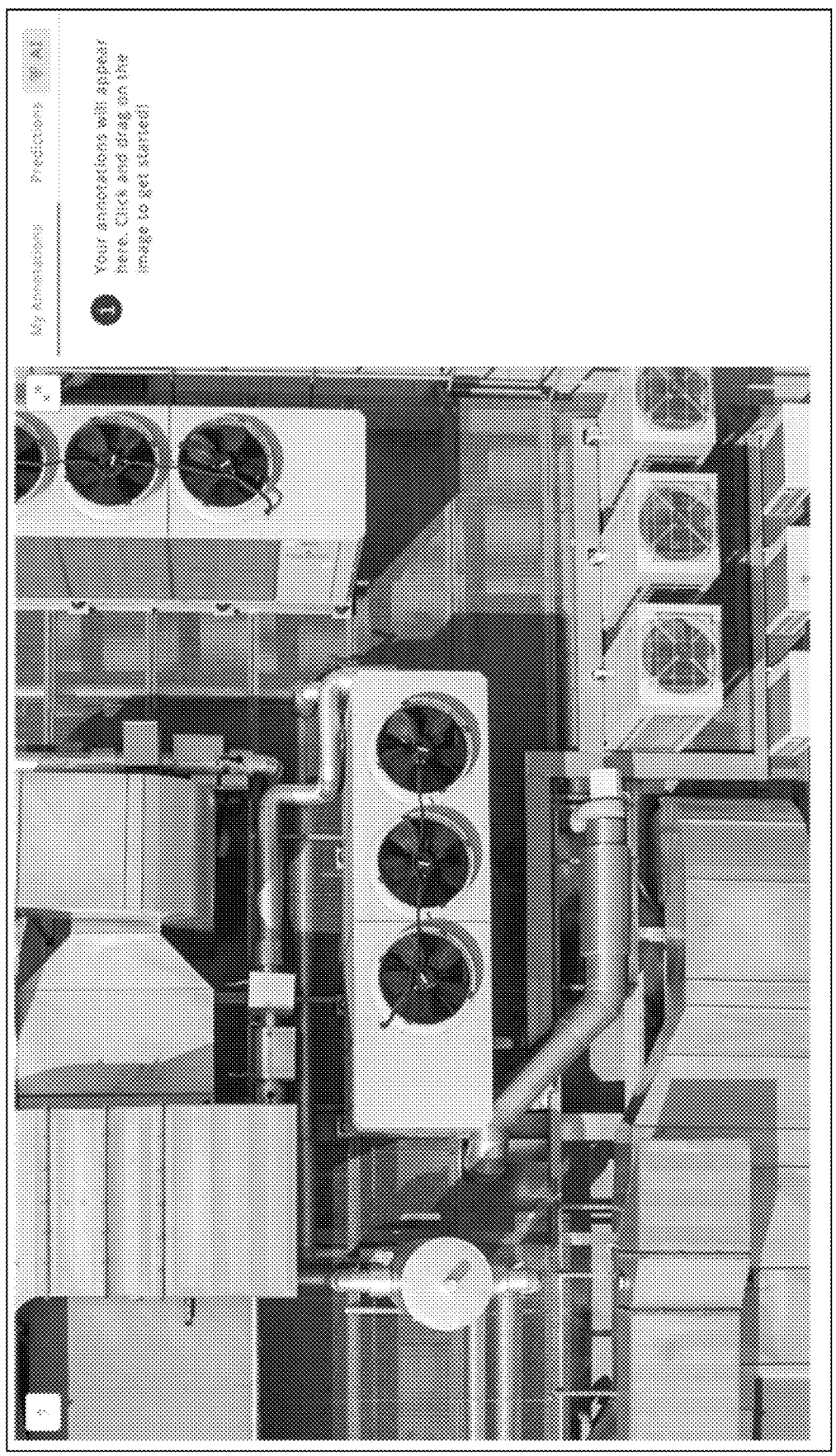

FIGS. 10A-10C illustrate examples of orthomosaic processing by the system, according to various embodiments. Often when UAV imagery is collected, many images are taken directly top-down, but collected in an overlapping scanning pattern with the intent of combining them into an orthographically projected (viewpoint infinitely far away) super-image, generally called an orthomosaic. These may be computed by computing the point-cloud using the overlapping images and then projecting the points onto an image that represents the (now) flat ground. However, this approach is computationally expensive as well as error-prone. Good orthomosaics generally also require manual assistance.

In various embodiments, the techniques herein further introduce a method for generating pseudo-orthomosaics. The drawback to this approach is that the resulting images are not as visually appealing or homogenous as traditionally computed orthomosaics. This pseudo-orthomosaic method leverages the fact that both GPS and viewing parameters are collected with the imagery. By projecting the collected camera locations onto the ground, the image analysis system can then form a Voronoi map and then map the collected imagery into their preferred Voronoi region.

Generally, there are some discrepancies in the precise offset or orientation of the image and the boundaries between the Voronoi regions become visible as a slight image shift. However, because the pseudo-orthomosaics can be computed almost instantaneously, it is a useful method for navigating the source images.

In further embodiments, the original source image can also be found from a location in the orthomosaic or pseudo-orthomosaic image. In order to use the orthomosaic for navigation (i.e., moving between the source images), the system may provide the user with an interface where the location of the pointer on the orthomosaic determines the desired image. For example, images 1000-1020 in FIGS. 10A-10C illustrate a user positioning a pointer on an image, to determine the desired image. In turn, the system may select the closest orthographically projected camera location as the source image and protect this image on top of the orthomosaic using the best available locations and rotations. By further user interface manipulations this image can be show at a larger scale for annotation or viewing before returning to the orthomosaic, as shown in images 1000-1020 in FIGS. 10A-10C.

In further embodiments, the roof pitch can also be determined from a location in the (pseudo-)orthomosaic. At times, it may be desirable to choose a location in the orthomosaic where the user would like an estimate of the pitch (angle) of the roof. By finding the location of not just the closest source image, but the closest 2-4 images, where the location does appear in the images, one can then find nearby key points in the images and compute the height differential over the ground distance to estimate the pitch. This is similar to computing the 3D location from a pair of stereoscopic images.

Slopes and measurements can also be obtained from top-down aerial or satellite images in orthomosaics. When there is no drone data available, it may still be possible to collect data from overhead aerial imagery or even using satellite imagery. These data sources will not have the requisite detail to allow the assessments of all the types of weather damage that drone imagery can provide. For example, damage from individual hail stones will not be visible. Certainly wind-damage that consists of a number of missing shingles will be visible, and there is still a need to estimate the damage. The first step is to use a version of the previously described CNN for boundary detection that has been trained for detecting roof boundaries in the same type imagery. After thresholding and applying the (modified) probabilistic Hough transform a number of edge segments are created. The second step is to take these edge segments and turn them into separate slopes of a roof. The segments are first extended such that the intersection between each pair is derived. These intersections are culled to preserve those that are close to the initially found end-points of the line segment, and these become the new end-points of the line segments. The intersection of parallel or near parallel lines are not derived, but in the case of parallel segments that form "jag" (almost continue, but with one shifted in the perpendicular direction), a small perpendicular line is inserted by creating new end-points for the line segments. After this, segments are traversed in a clockwise fashion to create slopes, with the remaining counter-clockwise slope representing the entire roof. A top-down image is almost like an orthomosaic in the sense that direct measurements of distances and areas are possible. Thus measurements of the lengths and areas of the slopes can be automatically generated ones the slopes have been found.

Figure 11:
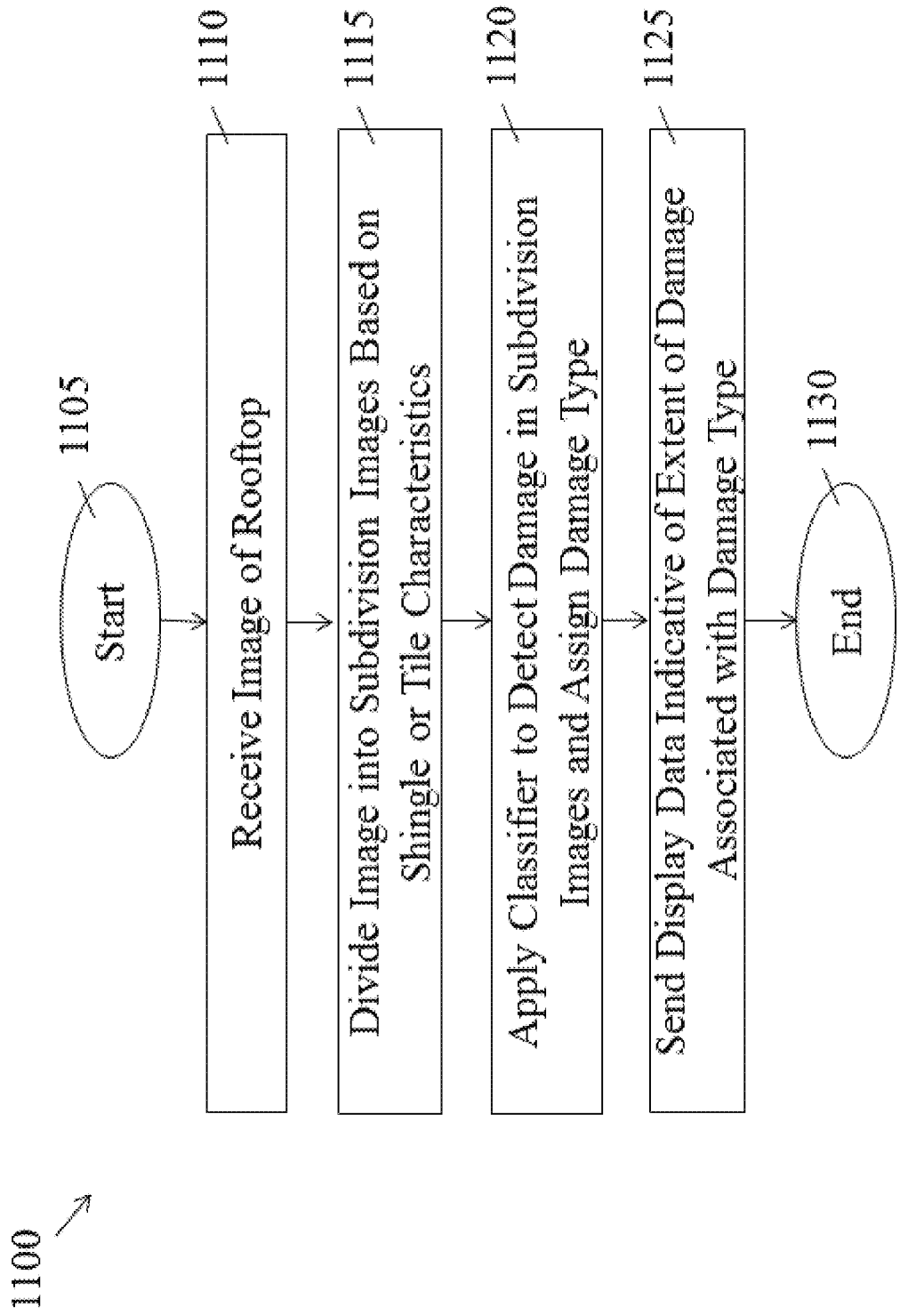
FIG. 11 illustrates an example simplified procedure for analyzing an image of a rooftop.

FIG. 11 illustrates an example simplified procedure 1100 for analyzing an image of a rooftop, according to various embodiments. Procedure 1100 may be performed by a non-generic, specifically configured device (e.g., device 200) by executing specialized instructions (e.g., image analysis process 248). The procedure 1100 may start at step 1105 and continue on to step 1110 where, as described in greater detail above, the device may receive an image of a rooftop. Such an image may be captured in any number of different ways including, but not limited by, UAV, satellite, manual operation of a camera, or the like. As would be appreciated, the image itself may be part of a collection of images of the rooftop taken from different angles and/or perspectives.

At step 1115, as detailed above, the device may divide the image into a plurality of subdivision images, based on one or more characteristics of rooftop shingles or tiles depicted in the subdivision images. In one embodiment, these characteristics may include a count of shingles or tiles depicted in the image. For example, the device may form the subdivision images such that the subdivision images each show a predefined range or set number of shingles/tabs or tiles. In another embodiment, the device may apply a zoomer function, such that the subdivision images are formed to depict any damage near the center of a subdivision image. Further characteristics that may dictate the subdivisions can include the specific slopes of the rooftop such that the slopes are segregated in the subdivision images.

At step 1120, the device may apply a machine learning-based classifier to one or more of the subdivision images, as described in greater detail above. In various embodiments, the classifier may be configured to detect damage done to a particular one of the shingles or tiles depicted in a particular subdivision image under analysis and to assign a damage type to the detected damage. For example, the classifier may be configured to detect damage to a shingle or tile within a subdivision image and label the damage as hail damage, ice damage, wind damage, wear and tear damage, and/or human-made damage.

At step 1125, as detailed above, the device may send display data for display that is indicative of an extent of damage to the rooftop associated with the assigned damage type. For example, the extent of damage may correspond to an area measurement (e.g., 400 square feet of damage, etc.), area percentage (e.g., 40% of the rooftop is damaged, etc.), shingle or tile count (e.g., 200 damaged shingles, etc.), or the like. In some cases, the display data may also indicate further information about the rooftop, such as material type, total area, etc. In doing so, the user is able to quickly diagnose the damage and determine which repairs are needed to the rooftop. Procedure 1100 then ends at step 1130.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

As will be appreciated, the above examples are intended only for the understanding of certain aspects of the techniques herein and are not limiting in nature. While the techniques are described primarily with respect to a particular device or system, the disclosed processes may be executed by other devices according to further implementations. For example, while the techniques herein are described primarily with respect to assessing weather-related damage of roofing tiles and shingles, some types of roof surfaces do not have a natural unit of processing (shingles, tiles etc.) but consist of pieces that cover much larger areas (metal sheets), sometimes even a whole roof (rubber membrane). By using the (even approximate) dimensions of the roof as guide, the system can crop images into smaller overlapping pieces that can be independently assessed for damage. The key idea here is that damage needs to be assessed at the scale of the damage, not at the scale of the roof or the building, so it is important to process the images in pieces that reflect the scale of the damage. Further, the techniques herein can be adapted to detect damage on the sides of houses and buildings, i.e., siding and facades. Similar to roofs, often there is a natural unit (shingles, siding boards, bricks etc.) that can be used in the same manner that has already been described.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device, an image of a rooftop;
   dividing, by the device, the image into a plurality of subdivision images, based on one or more characteristics of rooftop shingles or tiles depicted in the subdivision images by subdividing the image of the rooftop such that each of a plurality of the subdivision images depicts a) a number of shingle tabs or tiles within a predefined count range and b) damage to the shingles or tiles in a given subdivision image centered in the subdivision image, wherein the one or more characteristics comprise i) a count of shingle tabs or tiles and ii) damage to the shingles or tiles;
   applying, by the device, a machine learning-based classifier comprising a convolutional neural network to one or more of the subdivision images, wherein the classifier is configured to detect damage done to a particular one of the shingles or tiles depicted in a particular subdivision image under analysis and to assign a damage type to the detected damage; and
   sending, by the device, display data for display that is indicative of an extent of damage to the rooftop associated with the assigned damage type.

2. The method as in claim 1, wherein the damage type is indicative of at least one of: hail damage, ice damage, wind damage, wear and tear damage, or human-made damage.

3. The method as in claim 1, further comprising:
   performing edge detection on the rooftop shingles or tiles in the image, to identify individual shingle tabs or tiles; and
   determining the count of the individual shingle tabs or tiles depicted in each of the plurality of subdivision images.

4. The method as in claim 1, further comprising:
   estimating, by the device, a shingle tab or tile count for the rooftop, based on determined counts of individual shingle tabs or tiles in the image; and
   estimating, by the device, an area of damaged shingle or tiles of the rooftop associated with the damage type.

5. The method as in claim 1, wherein subdividing the image of the rooftop such that each of a plurality of the subdivision images depicts a number of shingle tabs or tiles within a predefined count range comprises:
   applying, by the device, a second machine learning-based classifier to portions of the image of the rooftop, wherein the second classifier was trained to output a shingle tab or tile count for an assessed portion of the image of the rooftop.

6. The method as in claim 1, further comprising:
   forming, by the device, a three dimensional model of the rooftop, in part by correlating points or edges depicted in a plurality of images of the rooftop.

7. The method as in claim 1, further comprising:
   applying, by the device, a second machine learning-based classifier to the image of the rooftop, to identify a roof type associated with the rooftop comprising at least one of: asphalt shingled, fiberglass shingled, wood shingled, tile, slate, metal, or rubber membrane.

8. The method as in claim 1, wherein the image of the rooftop was captured by an unmanned aerial vehicle (UAV).

9. The method as in claim 1, further comprising:
   applying, by the device, a second machine learning-based classifier to the image of the rooftop, to detect a boundary of the rooftop, wherein the classifier classifies the boundary as being one of: a ridge, a ridge edge, an occluding ridge, a hip, a hip edge, an occluding hip, a valley, a pitch change, an inside edge, an outside edge, or an occluding edge.

10. The method as in claim 1, further comprising:
    generating, by the device, a pseudo-orthomosaic image that combines the image of the rooftop with a plurality of other images of the rooftop by:
    projecting the images of the rooftop onto a ground to form a Voroni map;
    mapping the images of the rooftop to their corresponding Voroni regions of the map; and
    sending, by the device, the pseudo-orthomosaic image for display.

11. The method as in claim 1, wherein the machine learning-based classifier comprises a multilayer perceptron (MLP) model.

12. The method as in claim 1, further comprising:
    identifying, by the device, individual slopes of the rooftop based in part on the image of the rooftop.

13. The method as in claim 12, further comprising:
    performing, by the device, damage detection on one or more subdivision images on a per slope basis.

14. An apparatus, comprising:
    one or more network interfaces to communicate with a network;
    a processor coupled to the network interfaces and configured to execute one or more processes; and
    a memory configured to store a process executable by the processor, the process when executed configured to:
    receive an image of a rooftop;
    divide the image into a plurality of subdivision images, based on one or more characteristics of rooftop shingles or tiles depicted in the subdivision images by subdividing the image of the rooftop such that each of a plurality of the subdivision images depicts a) a number of shingle tabs or tiles within a predefined count range and b) damage to the shingles or tiles in a given subdivision image centered in the subdivision image, wherein the one or more characteristics comprise i) a count of shingle tabs or tiles and ii) damage to the shingles or tiles;
    apply a machine learning-based classifier comprising a convolutional neural network to one or more of the subdivision images, wherein the classifier is configured to detect damage done to a particular one of the shingles or tiles depicted in a particular subdivision image under analysis and to assign a damage type to the detected damage; and
    send display data for display that is indicative of an extent of damage to the rooftop associated with the assigned damage type.

15. The apparatus as in claim 14, wherein the damage type is indicative of at least one of: hail damage, ice damage, wind damage, wear and tear damage, or human-made damage.

16. The apparatus as in claim 14, wherein the process when executed is further configured to:
    estimating, by the apparatus, a shingle tab or tile count for the rooftop, based on the determined counts of individual shingle tabs or tiles in the image; and
    estimating, by the apparatus, an area of damaged shingle or tiles of the rooftop associated with the damage type.

17. A tangible, non-transitory, computer-readable medium storing program instructions that cause a device to execute a process comprising:

receiving, at the device, an image of a rooftop;

dividing, by the device, the image into a plurality of subdivision images, based on one or more characteristics of rooftop shingles or tiles depicted in the subdivision images by subdividing the image of the rooftop such that each of a plurality of the subdivision images depicts a) a number of shingle tabs or tiles within a predefined count range and b) damage to the shingles or tiles in a given subdivision image centered in the subdivision image, wherein the one or more characteristics comprise i) a count of shingle tabs or tiles and ii) damage to the shingles or tiles;

applying, by the device, a machine learning-based classifier comprising a convolutional neural network to one or more of the subdivision images, wherein the classifier is configured to detect damage done to a particular one of the shingles or tiles depicted in a particular subdivision image under analysis and to assign a damage type to the detected damage; and sending, by the device, display data for display that is indicative of an extent of damage to the rooftop associated with the assigned damage type.

18. The tangible, non-transitory, computer-readable medium of claim 17, wherein the damage type is indicative of at least one of: hail damage, ice damage, wind damage, wear and tear damage, or human-made damage.

19. The tangible, non-transitory, computer-readable medium of claim 17, the process further comprising:

estimating a shingle tab or tile count for the rooftop, based on determined counts of individual shingle tabs or tiles in the image; and estimating an area of damaged shingle or tiles of the rooftop associated with the damage type.

20. The tangible, non-transitory, computer-readable medium of claim 17, the process further comprising:

applying a second machine learning-based classifier to the image of the rooftop, to detect a boundary of the rooftop, wherein the classifier classifies the boundary as being one of: a ridge, a ridge edge, an occluding ridge, a hip, a hip edge, an occluding hip, a valley, a pitch change, an inside edge, an outside edge, or an occluding edge.

* * * * *